United States Patent [19]
Togai et al.

[11] Patent Number: 5,595,060
[45] Date of Patent: Jan. 21, 1997

[54] APPARATUS AND METHOD FOR INTERNAL-COMBUSTION ENGINE CONTROL

[75] Inventors: Kazuhide Togai, Takatsuki; Kazuo Koga, Okazaki, both of Japan

[73] Assignee: Mitsubishi Jidosha Kogyo Kabushiki Kaisha, Tokyo, Japan

[21] Appl. No.: 438,553

[22] Filed: May 10, 1995

[30] Foreign Application Priority Data

| May 10, 1994 | [JP] | Japan | 6-096270 |
| May 20, 1994 | [JP] | Japan | 6-106628 |
| Oct. 20, 1994 | [JP] | Japan | 6-255879 |

[51] Int. Cl.$^6$ ............................................. F01N 3/20
[52] U.S. Cl. .......................... 60/274; 60/276; 60/277; 60/278; 60/285; 60/301
[58] Field of Search ............................. 60/274, 276, 277, 60/278, 285, 301

[56] References Cited

U.S. PATENT DOCUMENTS

| 5,172,550 | 12/1992 | Takeshima | 60/278 |
| 5,209,061 | 5/1993 | Takeshima | 60/278 |
| 5,357,749 | 10/1994 | Ohsuga | 60/301 |
| 5,437,153 | 8/1995 | Takeshima | 60/301 |

FOREIGN PATENT DOCUMENTS 5-133260  5/1993  Japan .

*Primary Examiner*—Douglas Hart

[57] ABSTRACT

In a control apparatus and control method for an internal combustion engine having an exhaust purifying catalytic device for adsorbing nitrogen oxide contained in exhaust gases from the engine, the adsorption state of nitrogen oxide adsorbed by the catalytic device is estimated by an electronic control unit during the lean-combustion driving of the engine. If the catalytic device is saturated with nitrogen oxide, the ignition timing is delayed and the exhaust gas is recirculated to the intake side of the engine with the lean air-fuel ratio kept unchanged. This starts the nitrogen oxide reduced driving mode for deteriorating the combustion state in the engine. At this time, the engine output will not change by a great amount. Further, a reducing atmosphere is created around the catalytic device by unburnt gases, generated due to the deterioration of the combustion state, to deoxidize the adsorbed nitrogen oxide. As a result, the purifying ability of the catalytic device can be recovered to suppress the discharge amount of nitrogen oxide without deteriorating the smoothness of engine driving and fuel economy.

80 Claims, 16 Drawing Sheets

APPARATUS AND METHOD FOR INTERNAL-COMBUSTION ENGINE CONTROL

BACKGROUND OF THE INVENTION

1. Field of the Invention

This invention relates to an apparatus and method for internal combustion engine control capable of suppressing the emission of nitrogen oxide from an internal combustion engine to the atmosphere.

2. Description of the Related Art

There is known a method for improving the fuel economy or other performance of an internal combustion engine by controlling the air-fuel ratio to a target value (for example, 22) leaner than the theoretical air-fuel ratio (14.7) to thereby carry out lean-combustion in the engine when the engine is driven in a predetermined driving state. However, if a three-way catalytic converter is used for the engine to which the aforesaid method is applied, nitrogen oxide (NOx) cannot be sufficiently purified during the lean-combustion since the three-way catalytic converter does not operate at its full potential in the lean air-fuel ratio range. In this respect, attempts have been made to reduce the emission of NOx even in the lean-combustion driving by using a so-called NOx catalyst, which absorbs NOx discharged from the engine in an oxygen enriched state (oxidizing atmosphere) and deoxidizes the adsorbed NOx in a hydrocarbon (HC) excessive state (reducing atmosphere).

However, there is a limit to the amount of NOx which can be absorbed by the NOx catalyst. If the engine is continuously driven in the lean-combustion mode, the catalyst will be saturated with NOx. In this case, most part of NOx gas discharged from the engine is emitted to the atmosphere. To obviate this, before or when the NOx catalyst is saturated with adsorbed NOx, a shift is made to the rich mixture control, which controls the air-fuel ratio to a theoretical ratio or its near value to thereby start the theoretical ratio operation or rich-combustion operation of the engine. The resultant exhaust gas containing plenty of unburnt gases creates a reducing atmosphere for deoxidization of NOx around the catalyst.

Regarding the timing at which the lean-combustion operation is switched to the theoretical ratio operation or rich-combustion operation, a method is known from Japanese Patent Application KOKAI Publication No. H5-133260 in which the elapse time from the start of lean air-fuel ratio control is measured, and the changeover to rich air-fuel control is forcibly carried out when a predetermined time has elapsed. With this method, the lean air-fuel ratio control is started again upon completion of deoxidization of NOx adsorbed by the catalyst during the rich air-fuel ratio control. In this way, the lean-combustion and rich-combustion are alternately effected to reduce the emission of NOx.

However, according to the control disclosed in the aforementioned Publication, if the predetermined time has elapsed from the start of the lean air-fuel ratio control, it is always determined that the amount of adsorbed NOx has reached the saturated amount. In this instance, the lean-combustion mode is forcibly changed to the rich-combustion mode. Thus, the improvement of fuel economy by the lean-combustion cannot be sufficiently achieved, and the fuel economy will be lowered accordingly. Moreover, at the time of changing the air-fuel ratio, the engine torque varies to give a bad influence on the engine operation. In a vehicle using the engine as the primary drive, an engine torque variation can cause a shock similar to acceleration shock, and hence the drive feeling will be deteriorated if the engine torque variation frequently occurs while the vehicle is driven at a constant speed. Further, the emission of HC increases when the air-fuel ratio is enriched. Therefore, from the viewpoint of improving the drive feeling and reducing the emission of HC, it is not preferable to forcibly and frequently change the air-fuel ratio.

Disclosed in International Patent Publication No. WO93/08383 is a technique for deoxidizing NOx adsorbed by the exhaust purifying device during the lean-combustion driving of an engine. In this technique, the adsorption amount of NOx by the exhaust purifying catalyst is estimated, and the driving mode is changed to the rich-combustion mode when it is determined based on the result of estimation that the adsorption amount of NOx has reached the saturation amount.

However, according to this technique, in which whether or not the catalyst is saturated with NOx is determined based on the estimated adsorption amount of NOx, if the NOx adsorbing abilities of catalysts mounted to individual engines are different from one another, it is sometimes impossible to correctly determine that the catalyst has reached the saturated state.

SUMMARY OF THE INVENTION

An object of this invention is to provide an apparatus and method for internal combustion engine control capable of suppressing the emission of nitrogen oxide from an internal combustion engine to the atmosphere, without deteriorating the smoothness of the engine driving and the fuel economy.

Another object of this invention is to provide an apparatus and method for internal combustion engine control capable of enhancing deoxidization of nitrogen oxide adsorbed by an exhaust purifying catalytic device, while keeping the engine operated in the lean-combustion mode and recover the purifying ability of the catalytic device and thereby suppress the emission of nitrogen oxide.

Still another object of this invention is to provide an apparatus and method for internal combustion engine control capable of correctly and easily determining that the amount of adsorbed nitrogen oxide has reached a saturated amount, without the need of directly deriving the adsorption amount of nitrogen oxide on an exhaust purifying catalytic device, and capable of driving the engine in a good condition based on the result of determination.

Another object of this invention is to provide an apparatus and method for internal combustion engine control capable of positively suppressing generation of nitrogen oxide itself.

Still another object of this invention is to provide an apparatus and method for internal combustion engine control capable of improving the response to the demand for accelerated engine driving.

According to a first aspect of this invention, there is provided a control apparatus for an internal combustion engine having an exhaust purifying catalytic device disposed in an exhaust passage of the engine for reducing the emission of nitrogen oxide to atmosphere, the catalytic device being operable to adsorb nitrogen oxide, contained in exhaust gases discharged from the engine, when the engine is in the lean-combustion mode where the air-fuel ratio of an air-fuel mixture supplied to the engine is leaner than the theoretical air-fuel ratio, and to deoxidize the adsorbed nitrogen oxide when the engine is in the rich-combustion mode where the air-fuel ratio is equal to or richer than the theoretical air-fuel ratio.

This control apparatus comprises adsorption state estimating means for estimating the adsorption state of nitrogen oxide on the exhaust purifying catalytic device; and combustion-state deteriorating means for deteriorating the combustion state in the engine in accordance with the adsorption state of nitrogen oxide estimated by the adsorption state estimating means, when the engine is in the lean-combustion mode.

According to a second aspect of this invention, there is provided an internal combustion engine control method for reducing the emission of nitrogen oxide to atmosphere, by causing nitrogen oxide, contained in exhaust gases discharged from an internal combustion engine, to be absorbed on an exhaust purifying catalytic device disposed in the exhaust passage of the engine when the engine is in the lean-combustion mode where the air-fuel ratio of an air-fuel mixture supplied to the engine is leaner than the theoretical air-fuel ratio, and by deoxidizing the adsorbed nitrogen oxide by means of the exhaust purifying catalytic device when the engine is in the rich-combustion mode where the air-fuel ratio is equal to or richer than the theoretical air-fuel ratio.

This control method comprises a first step of estimating the adsorption state of nitrogen oxide on the exhaust purifying catalytic device; and a second step of deteriorating the combustion state in the internal combustion engine in accordance with the adsorption state of nitrogen oxide estimated in the first step, when the engine is in the lean-combustion mode.

The control apparatus and method of this invention are advantageous in that the combustion state in the engine is permitted to be deteriorated when the absorbed amount of nitrogen oxide increases, to thereby supply unburnt gases to the exhaust purifying catalytic device for deoxidization of nitrogen oxide absorbed on the exhaust purifying catalytic device, and that the discharge amount of nitrogen oxide from the engine itself can be suppressed. Therefore, unlike the case where the driving mode is forcibly changed from the lean-combustion mode to the theoretical ratio driving mode or the rich-combustion mode, the discharge amount of nitrogen oxide from the engine can be reduced without deteriorating the smoothness of the engine driving and the fuel economy.

Preferably, the adsorption state estimating means of the control apparatus includes adsorption saturation determining means for determining whether or not the adsorption amount of nitrogen oxide on the exhaust purifying catalytic device has reached a value equal to or near the saturation amount. Further, the combustion-state deteriorating means deteriorates the combustion state when the adsorption saturation determining means determines that the adsorption amount of nitrogen oxide on the exhaust purifying catalytic device has reached the value equal to or near the saturation amount in the lean-combustion mode.

In this preferred embodiment, when the exhaust purifying catalytic device is saturated with the adsorbed nitrogen oxide, the amount of unburnt gases can be increased by deteriorating the combustion state in the engine, without the need of increasing the amount of fuel supply, while maintaining the internal combustion engine in the lean-combustion mode. This makes it possible to adequately deoxidize and remove the adsorbed nitrogen oxide by hydrocarbon contained in the unburnt gases. Therefore, the purifying ability of the exhaust purifying catalytic device can be recovered, and the emission of nitrogen oxide can be suppressed without deteriorating the fuel economy and the drive feeling.

More preferably, the adsorption saturation determining means includes nitrogen oxide discharge amount estimating means for estimating the discharge amount of nitrogen oxide from the exhaust purifying catalytic device, or lean-combustion period measuring means for measuring the lean-combustion period for which the lean-combustion mode is continued, or lean-combustion accumulating means for accumulating pieces of load information on the internal combustion engine driven in the lean-combustion mode to thereby derive an accumulated value of the pieces of load information. When the nitrogen oxide discharge amount estimated by the nitrogen oxide discharge amount estimating means has exceeded a predetermined value, or when the lean-combustion period measured by the lean-combustion period measuring means has exceeded a predetermined value, or when the accumulated value of the pieces of load information derived by the lean-combustion accumulating means has exceeded a predetermined value, it is determined that the adsorption amount of nitrogen oxide on the exhaust purifying catalytic device has reached a value equal to or near the saturation amount.

According to these preferred embodiments, the timing at which the adsorption amount of nitrogen oxide has reached the saturation amount can be correctly and easily determined in accordance with the discharge amount of nitrogen oxide, the lean-combustion period, or the accumulated value of the pieces of load information on the engine which is driven in the lean-combustion mode, without the need of directly deriving the adsorption amount of nitrogen oxide on the exhaust purifying catalytic device.

Preferably, the combustion-state deteriorating means of the control apparatus lowers the combustion temperature of the air-fuel mixture supplied to the internal combustion engine in accordance with the adsorption state of nitrogen oxide estimated by the adsorption state estimating means. According to this preferred embodiment, generation of nitrogen oxide in a period during which the driving mode is changed from the lean-combustion mode to the theoretical ratio driving mode or the rich-combustion mode can be positively suppressed by lowering the combustion temperature of the air-fuel mixture.

More preferably, the control apparatus further includes acceleration determining means for determining whether or not the internal combustion engine is in the acceleration driving mode by comparing the load information, indicating the load state of the internal combustion engine, with an acceleration determining threshold value; air-fuel ratio adjusting means for adjusting the air-fuel ratio to a value equal to or richer than the theoretical air-fuel ratio when the accelerating means determines that the internal combustion engine is in the acceleration driving mode; and threshold value changing means for changing the acceleration determining threshold value in accordance with the adsorption state of nitrogen oxide estimated by the adsorption state estimating means.

According to this preferred embodiment, in a case where the combustion temperature is lowered and the engine output is lowered as the exhaust purifying catalytic device is saturated with adsorbed nitrogen oxide, it becomes easier to change the driving mode from the lean-combustion mode to the theoretical ratio driving mode or the rich-combustion mode in which the engine output is high, thereby making it possible to improve the response to the acceleration driving demand.

Preferably, the combustion-state deteriorating means of the control apparatus includes an ignition timing adjusting device for adjusting the ignition timing of the internal combustion engine, or an exhaust gas recirculating device for recirculating the exhaust gas from the internal combustion engine to the intake system of the engine, or an air-fuel ratio adjusting device for adjusting the air-fuel ratio of an air-fuel mixture supplied to the engine. The combustion-state deteriorating means lowers the combustion temperature by delaying the ignition timing, or increasing the recirculating amount of exhaust gas, or changing the air-fuel ratio towards the lean side. According to the above preferred embodiments, the combustion temperature of the air-fuel mixture can be adequately and easily adjusted.

Preferably, the combustion-state deteriorating means maintains deterioration of the combustion state for a predetermined period of time. According to this preferred embodiment, the adsorbed nitrogen oxide can be sufficiently deoxidized by maintaining the deteriorated combustion state.

Preferably, the combustion-state deteriorating means deteriorates the combustion state in the internal combustion engine by causing a misfire in the engine. According to this preferred embodiment, unburnt gases can be easily generated, thereby making it possible to enhance deoxidization of the adsorbed nitrogen oxide.

The control method of this invention has its preferred embodiments similar to those of the aforementioned control apparatus, which produce similar advantages.

According to a third aspect of this invention, the control apparatus is provided, which apparatus comprises nitrogen oxide discharge amount estimating means for estimating the discharge amount of nitrogen oxide from the exhaust purifying catalytic device; adsorption saturation determining means for determining whether or not the discharge amount of nitrogen oxide estimated by the nitrogen oxide discharge amount estimating means has exceeded a predetermined amount; and combustion state changing means for changing the air-fuel ratio of an air-fuel mixture to thereby make a change from the lean-combustion mode to the rich-combustion mode when the adsorption saturation determining means determines that the estimated discharge amount of nitrogen oxide has exceeded the predetermined amount in the lean-combustion mode.

According to a fourth aspect of this invention, the control method is provided, which comprises a first step of estimating the discharge amount of nitrogen oxide from the exhaust purifying catalytic device; a second step of determining whether or not the discharge amount of nitrogen oxide estimated in the first step has exceeded a predetermined amount; and a third step of changing the air-fuel ratio of an air-fuel mixture to thereby make a change from the lean-combustion mode to the rich-combustion mode when it is determined in the second step that the discharge amount of nitrogen oxide has exceeded the predetermined amount in the lean-combustion mode.

According to the control apparatus and method of the third and fourth aspects of this invention, the discharge amount of nitrogen oxide can always be kept equal to or less than the predetermined amount. Further, the air-fuel ratio can be prevented from being changed to the rich side unless the discharge amount of nitrogen reaches the predetermined amount, and thus the deteriorated fuel economy caused by the rich-combustion and the engine torque variation caused by the changeover of air-fuel ratio can be suppressed to a minimum. Further, like the control apparatus and method according to the first and second aspects, the discharge amount of nitrogen oxide from the engine can be reduced without deteriorating the smoothness of the engine driving and the fuel economy.

These and other objects and advantages will become more readily apparent from an understanding of the preferred embodiments described below with reference to the following drawing figures.

BRIEF DESCRIPTION OF THE DRAWINGS

The invention will become more fully understood from the detailed description given herein below with reference to the accompanying figures, given by way of illustration only and not intended to limit the present invention, in which.

DETAILED DESCRIPTION OF THE PREFERRED EMBODIMENTS

There will now be described a combustion controlling method and apparatus for an internal combustion engine according to various embodiments of this invention with reference to the accompanying drawings.

Figure 1:
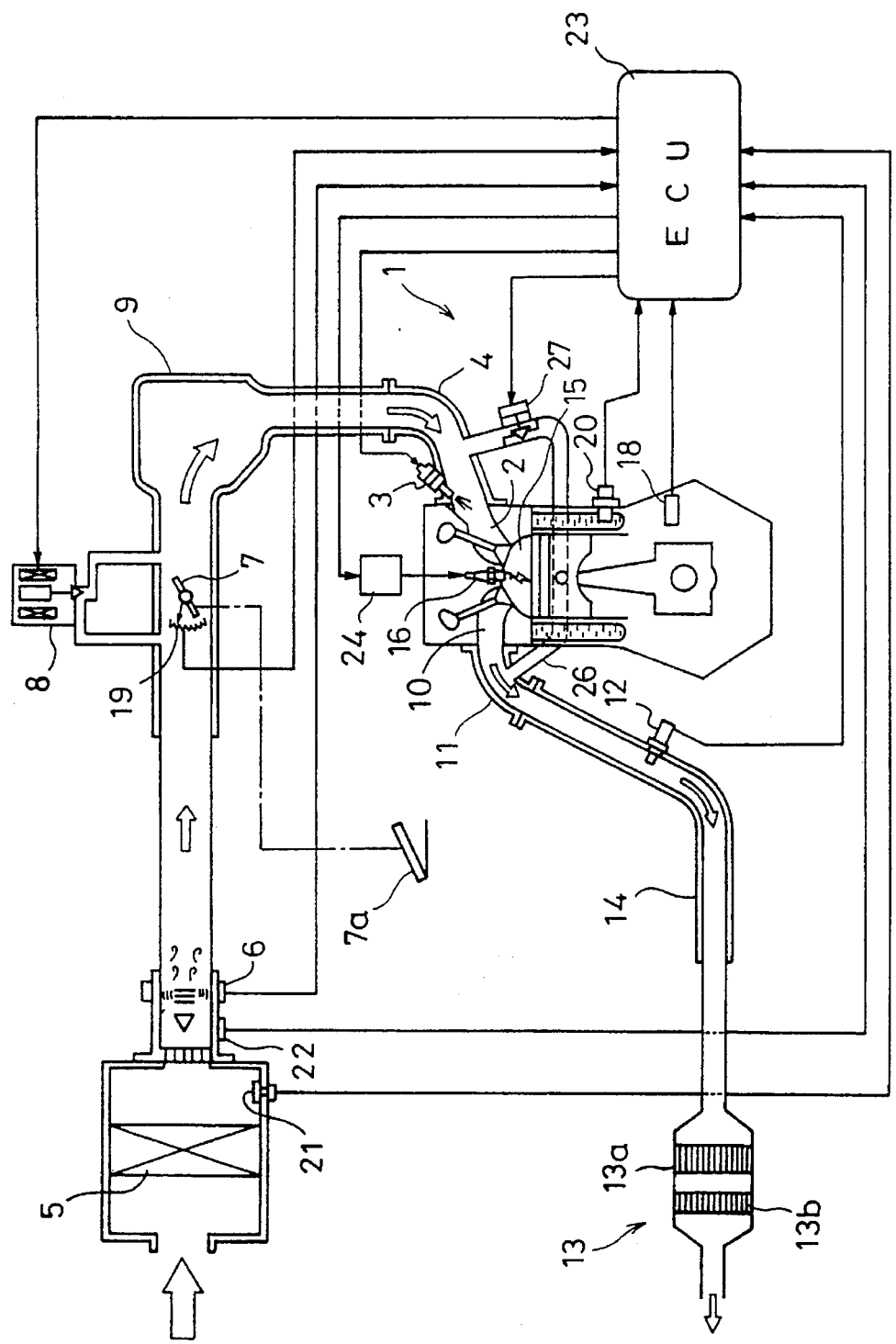
FIG. 1 is a schematic view showing a combustion controlling apparatus according to one embodiment of this invention together with an engine.

In FIG. 1, reference numeral 1 denotes the automotive engine driven under the control of a combustion control apparatus which will be described later. The engine, which is, e.g., a six-cylinder inline gasoline engine, includes combustion chambers, intake system, ignition system and the like designed to cope with lean-combustion driving.

The engine 1 has intake ports 2 connected to an intake manifold 4 in which fuel injection valves 3 for respective cylinders are provided. An intake pipe 9 connected to the intake manifold 4 is provided with an air cleaner 5 and a throttle valve 7 (more generally, an output operating device for adjusting the engine output). The throttle valve 7 is interlocked with the acceleration pedal 7a. An idling engine speed control (ISC) valve 8 is provided in a bypass passage which bypasses the throttle valve 7. An exhaust manifold 11 is connected to exhaust ports 10 of the engine 1. Further, a muffler (not shown) is connected to the exhaust manifold 11 via an exhaust pipe 14 and an exhaust purifying catalytic device 13.

The exhaust purifying catalytic device 13 has an NOx catalyst 13a and a three-way catalytic converter 13b disposed on the downstream side of the NOx catalyst 13a. The NOx catalyst 13a contains, as catalytic substance, Pt (platinum) and alkali rare earth metal such as lanthanum and cerium, for instance, and has a function of adsorbing NOx in the oxidizing atmosphere and deoxidizing NOx into $N_2$ (nitrogen) and the like in the reducing atmosphere which contains HC. The three-way catalytic converter 13b has a function of oxidizing HC and CO (carbon monoxide) and deoxidizing NOx. The NOx deoxidizing ability maximizes in or near the theoretical (stoichiometric) air-fuel ratio.

Further, a circulating passage 26 for exhaust gas recirculation (EGR) is connected between the exhaust manifold 11 and the intake manifold 4, so that part of exhaust gases in the exhaust manifold 11 is fed back to the intake manifold 4 via the circulating passage 26 and supplied to the combustion chamber 15 when an EGR valve 27 disposed in the passage 26 is open. If the exhaust gas is thus recirculated to the intake side, the combustion temperature is lowered to suppress generation of NOx.

The engine 1 is further provided with an ignition plug 16 for igniting a mixture of air and fuel supplied from the intake port 2 to the combustion chamber 15.

The combustion control apparatus according to a first embodiment of this invention for controlling the combustion in the engine 1 has an electronic control unit (ECU) 23 as a main constituent. The ECU 23 has an input/output device, a memory device (ROM, RAM, non-volatile RAM or the like) having various control programs stored therein, a central processing unit (CPU), timer counter and the like (none of which is shown in the drawing). Various sensors shown in FIG. 1 are connected to the input side of the ECU 23.

In FIG. 1, reference numeral 6 denotes an air flow sensor, mounted on the intake pipe 9, for detecting the intake air amount $A_f$. A Karman vortices air flow sensor or the like is adequately used as the air flow sensor 6. Further, reference numeral 12 denotes an air-fuel ratio sensor (linear air-fuel ratio sensor or the like), mounted on the exhaust pipe 14, for detecting the air excess ratio λ (more generally, air-fuel ratio information variable); 18 denotes a crank angle sensor having an encoder interlocked with the cam shaft of the engine 1 and generating a crank angle synchronization signal $\theta_{CR}$; and 19 denotes a throttle sensor for detecting the opening $\theta_{TH}$ of the throttle valve 7. Further, reference numeral 20 denotes a water temperature sensor for sensing the engine coolant temperature $T_W$; 21 denotes an atmospheric pressure sensor for sensing the atmospheric pressure $P_a$; and 22 denotes an intake air temperature sensor for sensing the intake air temperature $T_a$. The engine speed $N_e$ is calculated by the ECU 23 according to the time interval between crank angle synchronization signals $\theta_{CR}$ supplied from the crank angle sensor 18. The engine load $L_e$ is calculated according to the engine rotation speed $N_e$ or the throttle opening $\theta_{TH}$ detected by the throttle sensor 19.

The ECU 23 calculates the optimum values of the fuel injection amount, ignition timing and the like based on pieces of information detected by various sensors. The ECU 23 drives the fuel injection valves 3 and ignition unit 24 in accordance with the results of calculation. These elements 3 and 24 are connected to the output side of the ECU 23. The ignition unit 24 supplies a high voltage to the ignition plug 16 of each cylinder in response to the command from the ECU 23.

Figure 2:
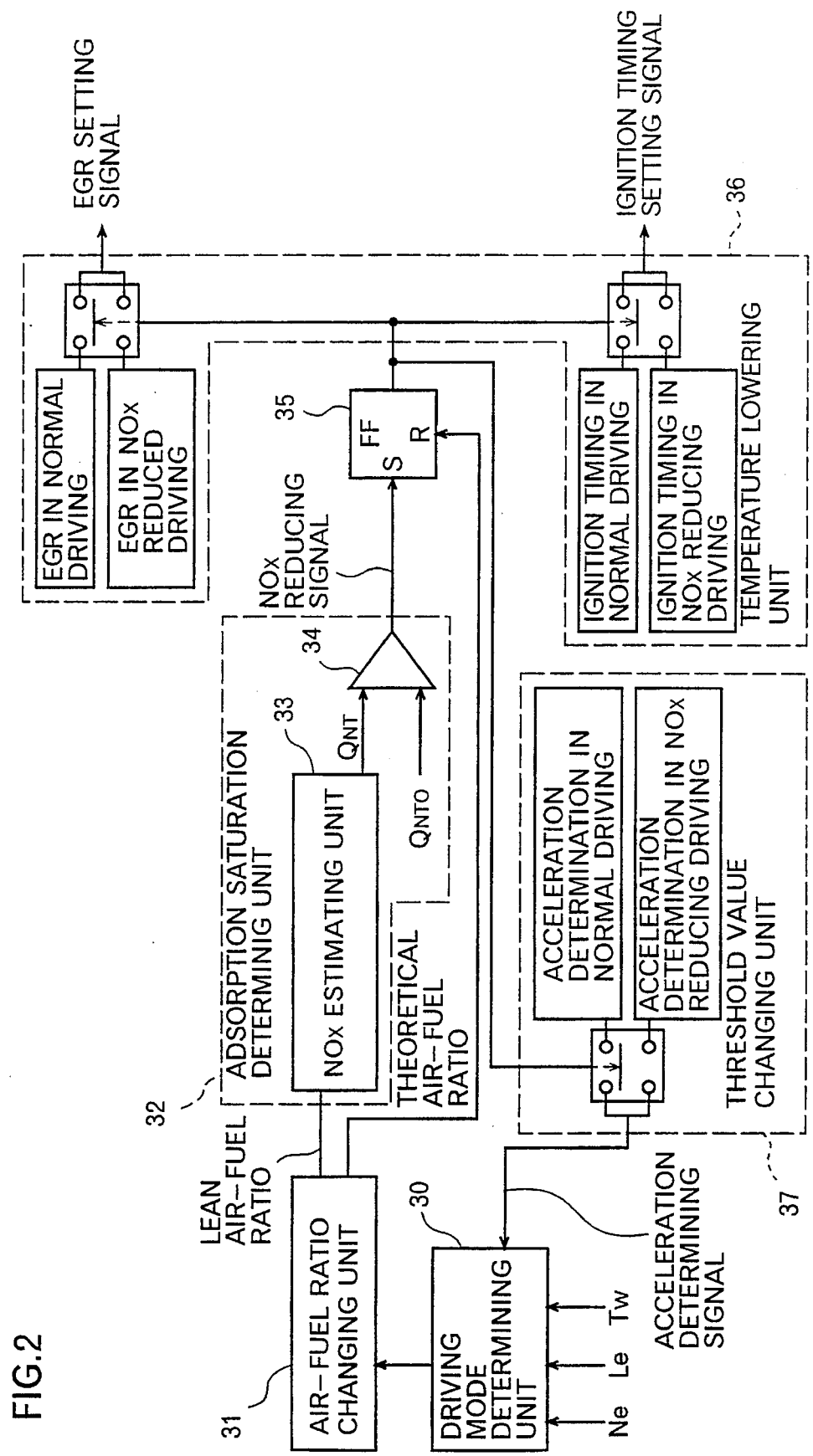
FIG. 2 is a functional block diagram of the combustion controlling apparatus shown in FIG. 1.

The ECU 23 of this embodiment functionally has various means shown in FIG. 2.

More specifically, the ECU 23 has driving mode determining unit 30 for determining whether the engine 1 should be driven in the lean-combustion mode or the theoretical air-fuel ratio driving mode (hereinafter referred to as theoretical ratio driving mode) according to the engine speed $N_e$, coolant temperature $T_W$, engine load $L_e$, and the presence/absence of the acceleration determining signal. Further, the ECU 23 includes air-fuel ratio changing unit 31 for switching the air-fuel ratio of an air-fuel mixture supplied to the engine 1 between the lean air-fuel ratio and the theoretical air-fuel ratio according to the result of determination of the driving mode determining unit 30. The ECU 23 also includes adsorption saturation determining unit 32 for determining whether or not the NOx catalyst 13a is saturated with NOx. The adsorption saturation determining unit 32 outputs an NOx reducing signal when determining that the NOx catalyst 13a is saturated with NOx. In a broad sense, the adsorption saturation determining unit 32 estimates the state of adsorption of NOx to the NOx catalyst 13a.

The adsorption saturation determining unit 32 includes catalyst-discharge NOx amount estimating unit (nitrogen oxide discharge amount estimating unit) 33 for deriving an estimated value $Q_{NT}$ of the discharge amount of NOx from the NOx catalyst 13a from pieces of information detected by corresponding sensors; and comparator 34 for comparing the estimated value $Q_{NT}$ with the threshold value $Q_{NTO}$. The comparator 34 supplies the NOx reducing signal to set flip-flop circuit 35 when the estimated value $Q_{NT}$ is larger than the threshold value $Q_{NTO}$. The flip-flop circuit 35 is reset when the theoretical air-fuel ratio is selected by the air-fuel ratio changing unit 31.

The ECU 23 includes combustion temperature lowering unit 36 for lowering the combustion temperature in the engine 1 as required. The temperature lowering unit 36 adjusts the EGR amount and ignition timing in the engine 1 according to the presence/absence of the NOx reducing signal, and increases the EGR amount and delays the ignition timing to lower the combustion temperature for reduction of NOx. In a broad sense, the temperature lowering unit 36 deteriorates the combustion state in the engine.

Further, the ECU 23 includes acceleration determination/ threshold value changing unit 37. The threshold value changing unit 37 compares the valve opening speed of the throttle valve 7 with an acceleration determining threshold value $A_{th}$. If the throttle valve opening speed exceeds the threshold value $A_{th}$, the threshold value changing unit 37 determines that the acceleration driving demand is issued, and outputs an acceleration determining signal. In response to this signal, the driving mode determining unit 30 determines that the engine 1 should be driven in the theoretical ratio driving mode. The threshold value $A_{th}$ used for determination by the threshold value changing unit 37 takes a different value according to the presence or absence of the NOx reducing signal. That is, if the NOx reduced driving is effected in response to the NOx reducing signal, the threshold value $A_{th}$ takes a small value; thus making it easier to change the driving mode from the lean-combustion mode to the theoretical ratio driving mode.

Next, the outline of the operation of the combustion control apparatus with the above construction is explained.

If the driving mode determining unit 30 determines that the engine 1 should be driven in the lean-combustion mode, the lean air-fuel ratio is selected by the air-fuel ratio changing unit 31. In this case, the throttle valve 7 and/or the ISC valve 8 is opened to increase the amount of intake air, with the injection amount of fuel from the fuel injection valve 3 kept substantially constant. As a result, an air-fuel mixture having the air-fuel ratio larger than the theoretical air-fuel ratio is supplied to the engine 1 whereby the engine 1 is driven in the lean-combustion mode. During lean-combustion driving, a reducing atmosphere is created around the NOx catalyst 13a so as to permit NOx, contained in the exhaust gases from the engine 1, to be adsorbed on the NOx catalyst 13a.

In the lean-combustion mode, moreover, the estimated value $Q_{NT}$ of the NOx discharge amount is estimated by the NOx estimating unit 33, and the estimated value $Q_{NT}$ is compared with the threshold value $Q_{NTO}$ by the comparator 34. If the estimated value $Q_{NT}$ is larger than the threshold value $Q_{NTO}$, it is determined that the NOx adsorbing ability of the NOx catalyst 13a has reached substantially the saturated state and the NOx reducing signal is output from the comparator 34. Then, the EGR amount and ignition timing are adjusted by the temperature lowering unit 36 which responds to the NOx reducing signal, and the NOx reducing driving is effected to deteriorate the combustion state or weaken the combustion in the engine 1. As a result, the combustion temperature is lowered to reduce the discharge amount of NOx.

Further, if the acceleration determining signal is supplied from the threshold value changing unit 37 to the driving mode determining unit 30, the driving mode determining unit 30 determines that the engine 1 should be driven in the theoretical ratio driving mode, and the theoretical air-fuel ratio is selected by the air-fuel ratio changing unit 31. In this case, a theoretical or stoichiometric air-fuel mixture is supplied to the engine 1, so that the engine 1 is driven in the theoretical ratio driving mode to increase the output of the engine 1. During the theoretical ratio driving, exhaust gases discharged from the engine 1 contain a greater amount of HC and CO than in the lean-combustion mode. Therefore, a reducing atmosphere is created around the NOx catalyst 13a to thereby effect deoxidization (reduction) of the adsorbed NOx.

Further, at the time of the NOx reducing driving, the acceleration determining threshold value is set to a smaller value so as to make it easier to change the driving mode to the theoretical ratio driving mode. As a result, the response to the acceleration driving demand can be improved in the NOx reduced driving in which the engine output is lowered in comparison with a case of NOx non-reduced driving.

Next, the operation of the combustion control apparatus is explained in detail.

Figure 3:
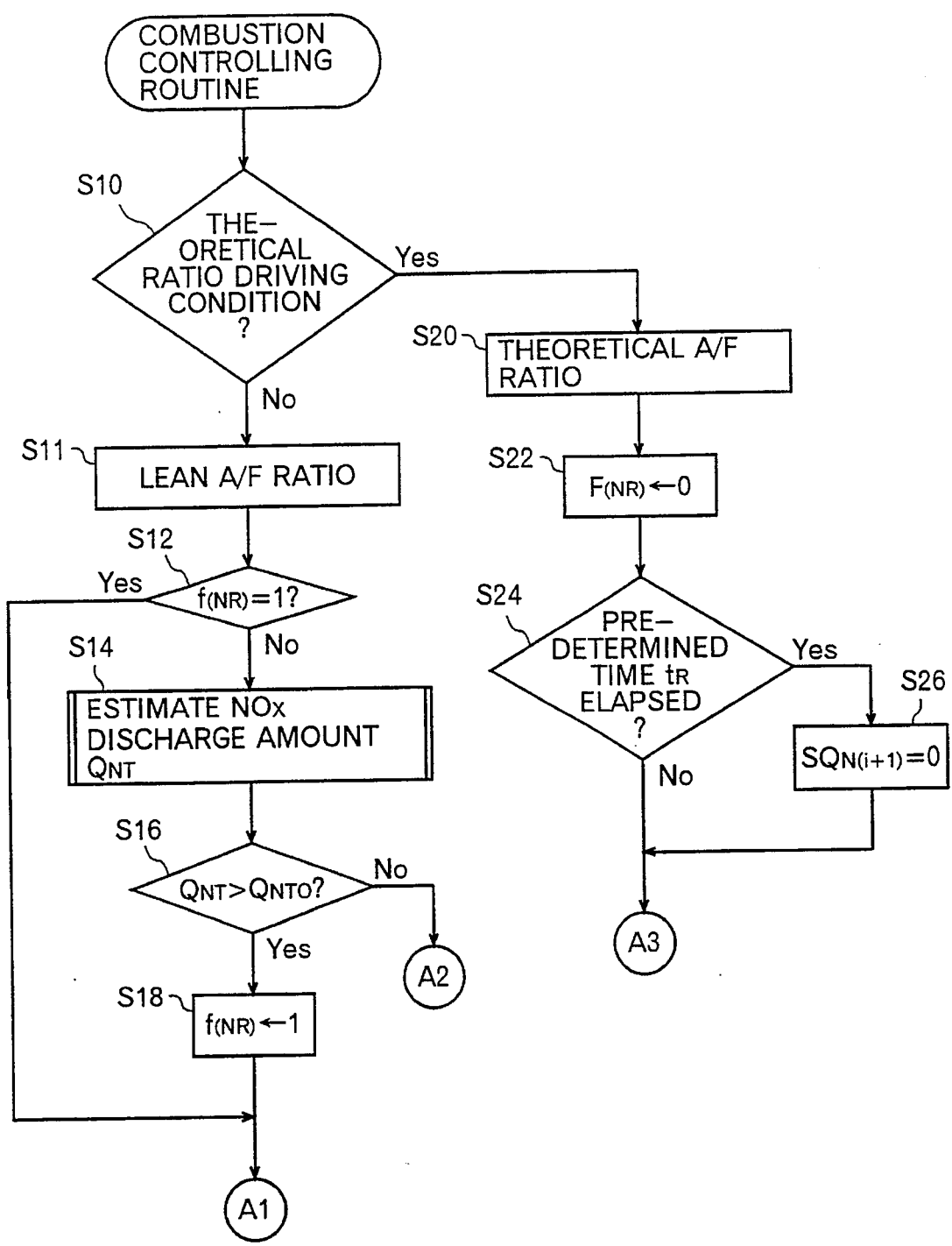
FIG. 3 is part of a flowchart of the combustion controlling routine executed by an electronic control unit shown in FIG. 2.
Figure 4:
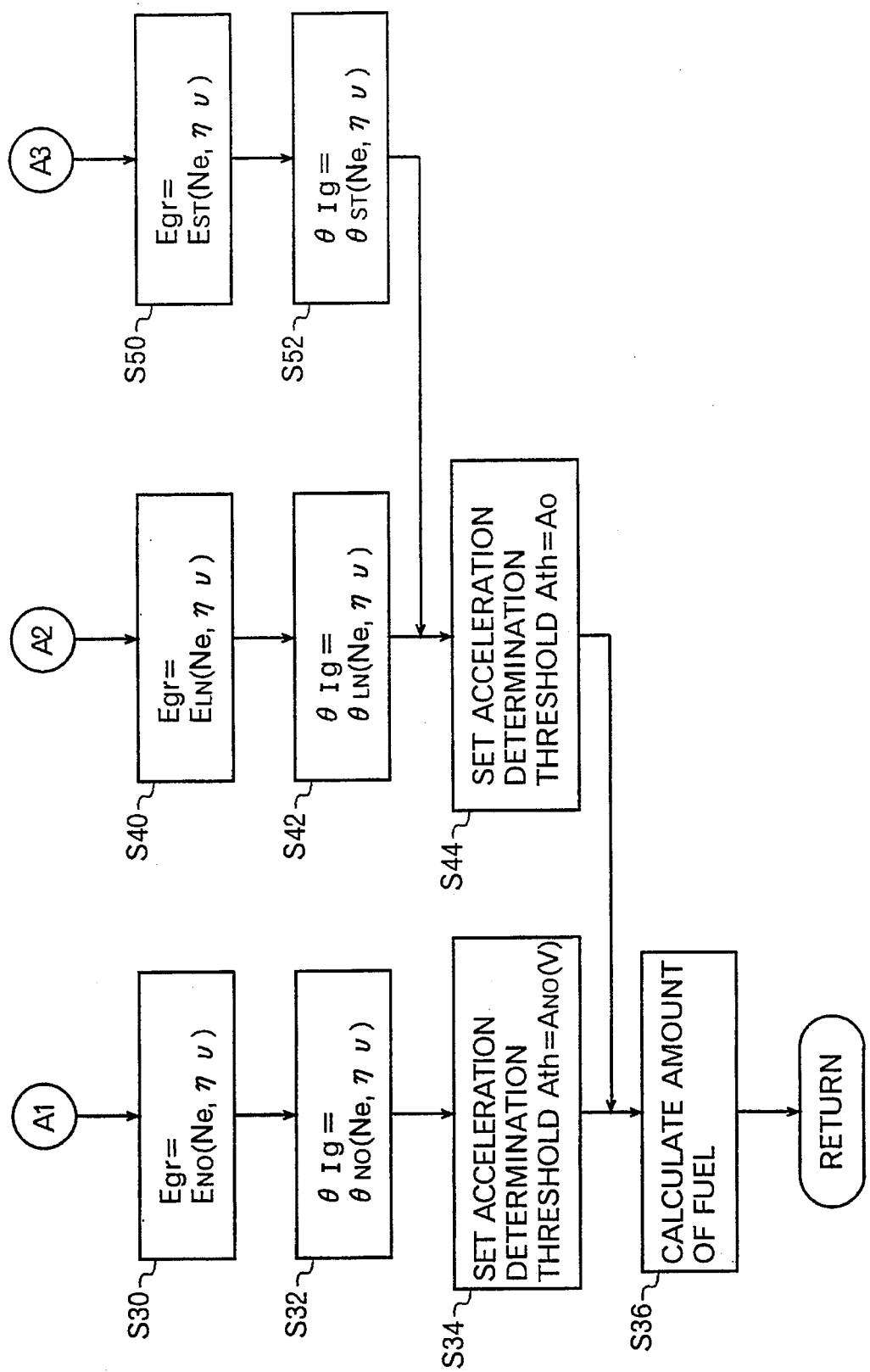
FIG. 4 is the remaining part of the flowchart of the combustion controlling routine following the flowchart of FIG. 3.

During the driving of the engine 1, a crank angle synchronization signal $\theta_{CR}$ is generated from the crank angle sensor 18 at each crank angle CA, for example, 120°. Each time the crank angle synchronization signal $\theta_{CR}$ is input to the ECU 23 as an interrupt signal, the combustion controlling routine shown in FIGS. 3 and 4 is executed by the ECU 23.

First, at the step S10, whether or not the theoretical ratio driving condition is satisfied is determined by the driving mode determining unit 30 of the ECU 23, according to the engine speed $N_e$, coolant temperature $T_W$, engine load $L_e$, and the presence/absence of the acceleration determining signal from the threshold value changing unit 37. For example, the theoretical ratio driving condition is satisfied when the engine speed $N_e$ and coolant temperature $T_W$ are equal to or larger than respective predetermined values and the engine load $L_e$ is equal to or smaller than a predetermined value. This condition is also satisfied when the acceleration determining signal is generated.

If the theoretical ratio driving condition is not satisfied and hence the result of determination at the step S10 is "NO", the air-fuel ratio is set to the lean air-fuel ratio by the air-fuel ratio changing unit 31 (step S11). At the next step S12, a determination is made as to whether or not the value of a flag f(NR) is "1" indicating execution of the NOx reducing driving. If the NOx catalyst 13a is not yet saturated with adsorbed NOx, the result of determination at the step S12 becomes "NO," and the control flow proceeds to the step S14.

At the step S14, the estimated value $Q_{NT}$ of a discharge amount of NOx from the exhaust purifying device 13 is calculated by the NOx estimating unit 33. For the estimated value $Q_{NT}$ calculation, a sub-routine is executed, which includes a process (FIG. 5) for calculating the discharged NOx amount $Q_{NO}$ from the engine 1 and a process (FIG. 6) for calculating the estimated value $Q_{NT}$ based on the value $Q_{NO}$ derived in the calculation process in FIG. 5.

Figure 5:
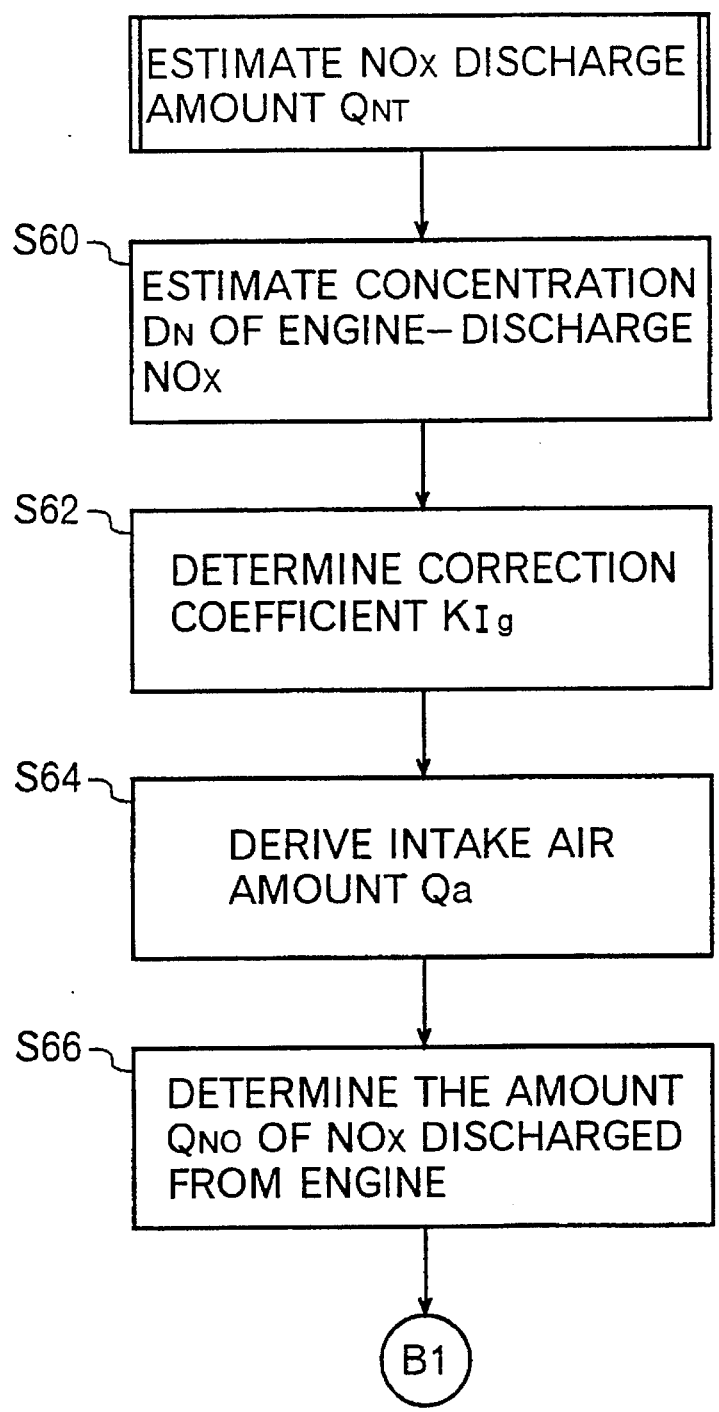
FIG. 5 is part of a flowchart of the NOx discharge amount $Q_{NT}$ calculating sub-routine shown in FIG. 4.

At the step S60 of FIG. 5, according to the air excess ratio $\lambda$ (more generally, air-fuel ratio information variable), the estimated value $D_N$ of the concentration of engine-discharge NOx (NOx discharged from the engine) is read from a map (FIG. 7), which is empirically determined and previously stored in the ECU 23. The air excess ratio $\lambda$ is either the measured value by the air-fuel ratio sensor 12 or a target value set according to the engine driving condition. Further, the estimated NOx concentration $D_N$ may be determined according to the air-fuel ratio or the equivalence ratio (which is a reciprocal of the air excess ratio) instead of the air excess ratio $\lambda$.

Figure 7:
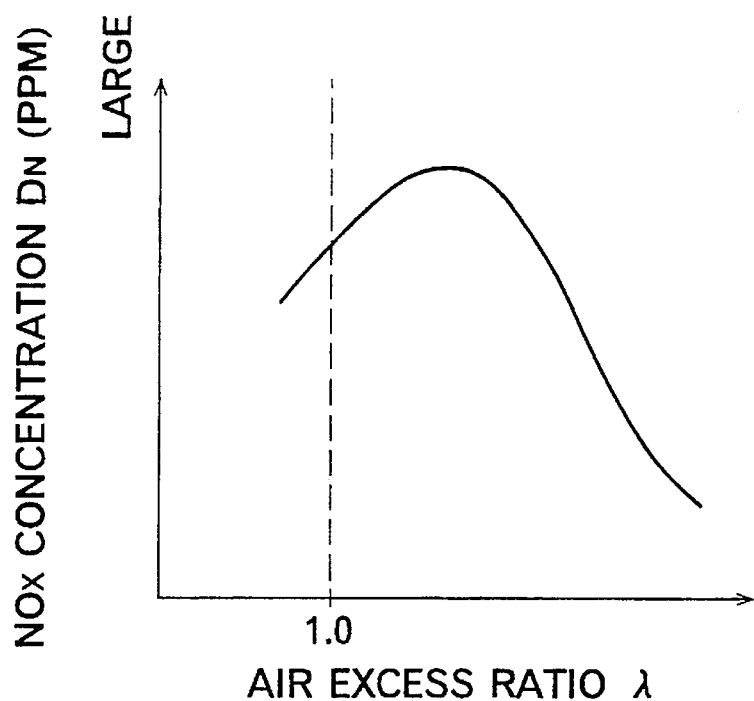
FIG. 7 is a graph showing an example of a map of air excess ratio λ-estimated amount $D_N$ of the concentration of engine-discharge NOx.

In the map of FIG. 7, the estimated value $D_N$ of the concentration of engine-discharge NOx is set in such a manner that it takes a maximum value when the air excess ratio λ is slightly larger than 1.0, that is, when the air-fuel ratio is slightly leaner than the theoretical air-fuel ratio. The estimated value $D_N$ decreases substantially at a constant rate with a decrease in the air excess ratio λ in a region (lean air-fuel ratio region) where the air excess ratio λ is small, and decreases substantially at a constant rate with an increase in the air excess ratio λ in a region (rich air-fuel ratio region) where the air excess ratio λ is large.

Figure 8:
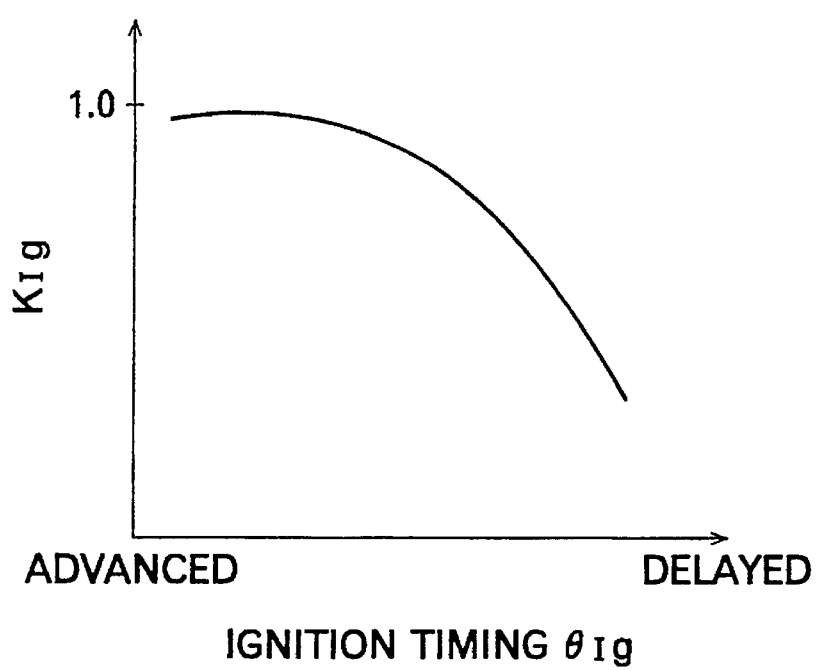
FIG. 8 is a graph showing an example of a map of ignition timing-correction coefficient $K_{Ig}$.

When reading the estimated value $D_N$ of the concentration of engine-discharge NOx is completed, the control flow proceeds to the step S62. At the step S62, a correction coefficient $K_{Ig}$ for the ignition timing is read from a map of FIG. 8. The correction coefficients $K_{Ig}$ having been stored beforehand in the ECU 23. In the map shown in FIG. 8, the correction coefficient $K_{Ig}$ is set to take a reference value 1.0 when the ignition timing is set at a predetermined value on the advancing side, and to decrease as the ignition timing is changed to the lag side.

As will be described later, the correction coefficient $K_{Ig}$ is used to correct the estimated value $D_N$ of the concentration of engine-discharge NOx read at the step S60. The correction is made to properly derive the amount of engine-discharge NOx in view of the fact that the combustion is weakened and the combustion temperature is lowered to reduce the amount of engine-discharge NOx when the ignition timing is changed to the lag side.

At the step S62, various correction coefficients for the EGR amount, intake air temperature, humidity and the like may be calculated and used to correct the estimated value $D_N$ of the concentration of engine-discharge NOx read at the step S60.

At the next step S64, an intake air amount $Q_a$ for each cylinder, that is, an intake air amount $Q_a$ from the preceding measuring time (prior to the present measuring time by the crank angle 120° CA) to the present measuring time is derived based on the detection value $A_f$ from the air flow sensor 6 and the engine speed $N_e$. In order to eliminate the influence of the atmospheric pressure and intake air temperature on the detection value $A_f$ of the air flow sensor 6, the detection value $A_f$ is corrected according to the detection signals $P_a$ and $T_a$ from the atmospheric pressure sensor 21 and intake air temperature sensor 22. The intake air amount $Q_a$ can also be derived from the engine speed $N_e$, intake air pressure $P_b$, etc., and the calculation method therefor is not limitative.

At the step S66, the amount $Q_{NO}$ of NOx discharged from the engine for each detection of the crank angle synchronization signal $\theta_{CR}$ is calculated by the following equation (1) according to the estimated value $D_N$ of the concentration of engine-discharge NOx, intake air amount $Q_a$ and correction coefficient $K_{Ig}$ derived as described above.

$$Q_{NO} = k_1 \times K_{Ig} \times Q_a \times D_N \tag{1}$$

where $k_1$ is a correction coefficient relating to the EGR amount, humidity and the like other than the correction coefficient $K_{Ig}$.

After the calculation of the amount $Q_{NO}$ of engine-discharge NOx, the control flow proceeds to the step S68. At the step S68, the accumulated value $SQ_{N(i+1)}$ of the amount $Q_{NO}$ of NOx discharged from the engine and passing the exhaust purifying catalytic device 13 up to the present time, which value expresses the integrated value $\int Q_{NO} dt$ of the amount $Q_{NO}$ of NOx discharged from the engine up to the present time, is calculated by the following equation (2):

$$\int Q_{NO} dt \approx SQ_{N(i+1)} = SQ_{N(i)} + Q_{NO} \tag{2}$$

where $SQ_{N(i)}$ indicates an integrated or accumulated value calculated in the preceding cycle of the control routine, and $Q_{NO}$ indicates the amount of engine-discharge NOx calculated at the step S66 in the present cycle of the control routine.

At the next step S70, an estimated value $K_{NOX}$ of the adsorption ratio of NOx on the NOx catalyst 13a when engine-discharge NOx passes the exhaust purifying catalytic device 13 is derived based on the accumulated value $SQ_{N(i+1)}$ of the amount of engine-discharge NOx derived at the step S68. For this purpose, an estimated adsorption ratio $K_{NOX}$ corresponding to the accumulated value $SQ_{N(i+1)}$ is read from the map of FIG. 9, which was previously stored in the ECU 23.

Figure 9:
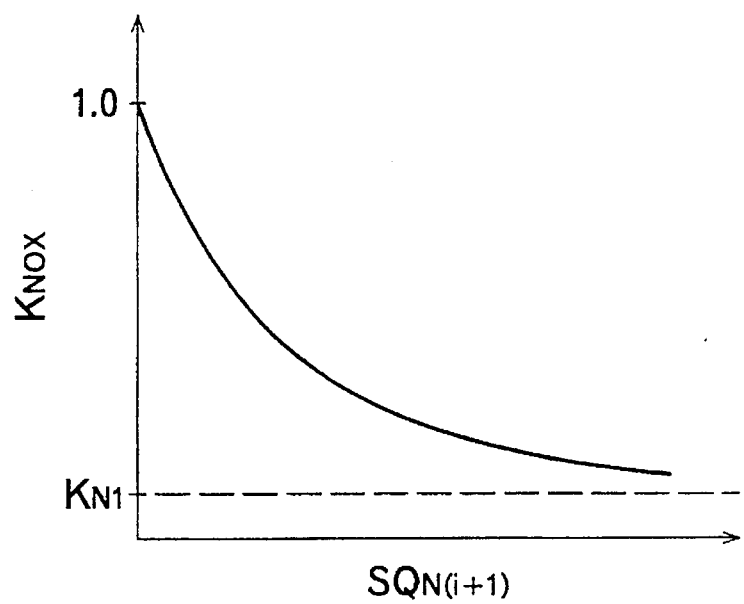
FIG. 9 is a graph showing an example of a map of accumulated value $SQ_{N(i+1)}$ of the amount of engine-discharge NOx-estimated adsorption ratio $K_{NOX}$ of NOx catalyst.

In the map of FIG. 9, the estimated adsorption ratio $K_{NOX}$ is set to take a maximum value 1.0 when the accumulated value $SQ_{N(i+1)}$ is "0" and gradually decrease to a predetermined value $K_{N1}$ (for example, a value of 0.1) with an increase in the accumulated value $SQ_{N(i+1)}$. An accumulated value $SQ_{N(i+1)}$-estimated adsorption ratio $K_{NOX}$ curve in FIG. 9 is expressed by the following equation (3):

$$K_{NOX} \approx (1-K_{N1}) \times \exp[(-k_2) \times SQ_{N(i+1)}] + K_{N1} \tag{3}$$

where $k_2$ is a correction coefficient (constant).

The estimated adsorption ratio $K_{NOX}$ may be derived by making a calculation based on the equation (3) instead of estimation of the adsorption ratio $K_{NOX}$ using the map of FIG. 9.

Figure 10:
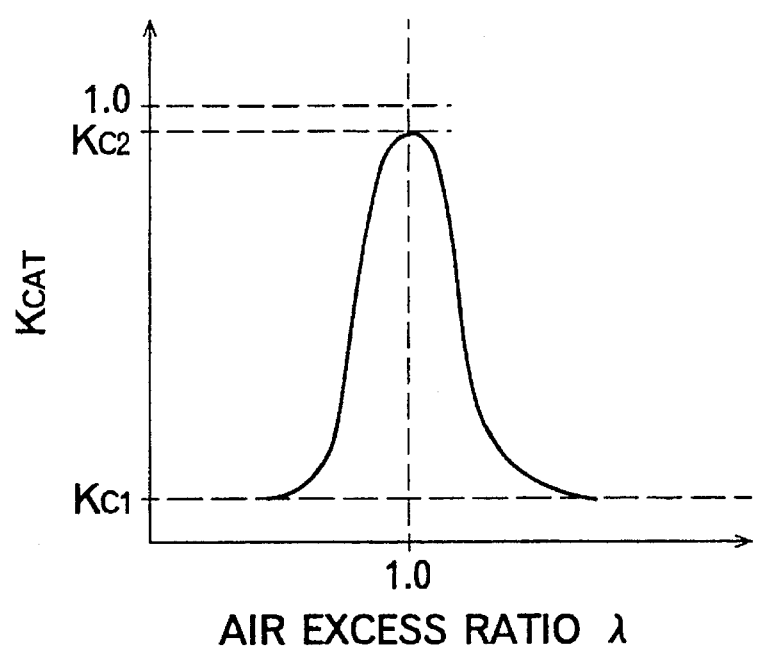
FIG. 10 is a graph showing an example of a map of air excess ratio λ-estimated value $K_{CAT}$ of the NOx purification ratio of a three-way catalytic converter.

At the next step S72, the estimated value $K_{CAT}$ of the ratio of NOx purification by the three-way catalytic converter 13b of the exhaust purifying catalytic device 13 is read from the map of FIG. 10 based on the air excess ratio λ. In view of the fact that the NOx purifying ability of the three-way catalytic converter 13b can be attained only in a narrow air excess ratio range where the air excess ratio λ is at 1.0 or its near value, the estimated purification ratio $K_{CAT}$ is set according to the map of FIG. 10 in such a manner that it rapidly increases to a maximum value $K_{C2}$ (for example, a value of 0.95) from a predetermined value $K_{C1}$ (for example, a value of 0 to 0.1) with an increase in the air excess ratio λ from a value slightly smaller than 1.0 to a value of 1.0, and rapidly decreases from the maximum value $K_{C2}$ to the predetermined value $K_{C1}$ with a further increase in the air excess ratio λ. Since the air excess ratio λ during the lean-combustion driving is a value (for example, 1.5) considerably larger than 1.0, the estimated purification ratio $K_{CAT}$ during the lean-combustion driving becomes equal to the predetermined value $K_{C1}$.

Instead of estimating the purification ratio $K_{CAT}$ using the map of FIG. 10, the estimated purification ratio $K_{CAT}$ may be simply derived by assuming that the purification ratio $K_{CAT}$ for the air excess ratio λ falling within the narrow air excess ratio range (for example, 0.95≤λ≤1.05) has a value of 0.95, and that the purification ratio $K_{CAT}$ for the air excess ratio λ falling within a range (for example, λ<0.95, 1.05<λ) outside the above narrow air excess ratio range has a value of "0".

At the next step S74, the NOx discharge ratio is calculated according to the equation (NOx discharge ratio=$(1-K_{NOX}) \times (1-K_{CAT})$) based on the engine-discharge NOx amount $Q_{NO}$, the estimated value $K_{NOX}$ of the adsorption ratio of NOx by the NOx catalyst 13a, and the estimated value $K_{CAT}$ of the NOx purification ratio by the three-way catalytic converter 13b. Further, the estimated value $Q_{NT}$ of the catalyst-discharge NOx amount for each detection of the crank angle synchronization signal $\theta_{CR}$ is calculated by use of the following equation (4) based on the NOx discharge ratio and the engine-discharge NOx amount $Q_{NO}$ calculated at the step S66. The estimated value $Q_{NT}$ is substantially equal to the actually measured value of the amount of NOx discharged from the exhaust purifying device 13 to atmosphere.

$$Q_{NT} = Q_{NO} \times \{(1-K_{NOX}) \times (1-K_{CAT})\} \quad (4)$$

The equation (4) indicates that, if the adsorption of NOx by the NOx catalyst 13a proceeds under such a condition that the purification ratio $K_{CAT}$ by the three-way catalytic converter 13b has the predetermined value $K_{C1}$, as in the lean-combustion mode, for example, the NOx purifying ability of the exhaust purifying device 13 is lowered and hence the catalyst-discharge NOx amount $Q_{NT}$ increases, so that the NOx adsorption ratio $K_{NOX}$ is lowered.

After the estimated value $Q_{NT}$ of the catalyst-discharge NOx amount is calculated, the control flow proceeds to the step S16 of FIG. 3. At the step S16, the comparator 34 determines whether or not the estimated value $Q_{NT}$ of the catalyst-discharge NOx amount derived as described above is larger than a predetermined threshold value $Q_{NTO}$. For instance, a legal limit of NOx emission is used as a basis for setting the threshold value $Q_{NTO}$. If the result of determination at the step S16 is "NO", that is, if the NOx adsorption amount has not reached the saturated state, it is determined that the amount of NOx discharged into the atmosphere is equal to or less than the maximum permissible value, and the control flow proceeds to the step S40 of FIG. 4.

Figure 17:
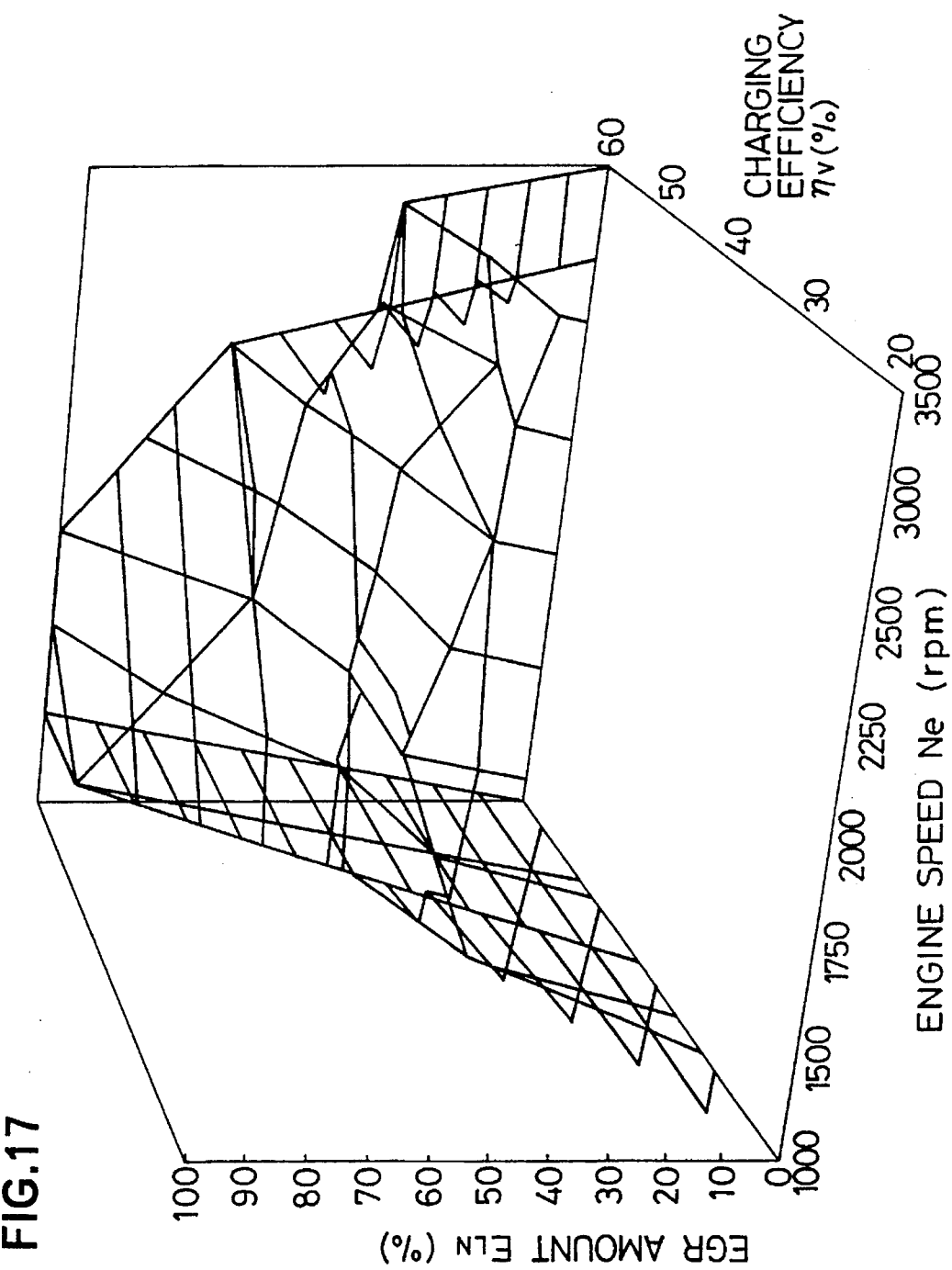
FIG. 17 is a graph showing, by way of example, an EGR amount map for normal lean-combustion driving, which is used in the combustion controlling routine shown in FIGS. 3 and 4.

At the step S40, the recirculating flow amount (which is hereinafter referred to as an EGR amount) $E_{gr}$ of EGR gas in the normal lean-combustion mode is set. More specifically, an EGR amount $E_{LN}$ is read, as the EGR amount $E_{gr}$ for the normal lean-combustion driving, from an EGR amount map (FIG. 17) for the normal lean-combustion driving previously stored in the ECU 23 according to the engine speed $N_e$ and the charging efficiency $\eta_v$ of the air-fuel mixture. In the EGR amount map, the EGR amount $E_{LN}$ is expressed as a function of the engine speed $N_e$ and the charging efficiency $\eta_v$ of the air-fuel mixture ($E_{gr}=E_{LN}(N_e, \eta_v)$). Unlike the NOx reduced driving mode or theoretical ratio driving mode, in the normal lean-combustion mode, a large EGR amount is not necessary. Therefore, the EGR amount $E_{LN}$ in the map is set smaller than EGR amounts $E_{NO}$, $E_{ST}$ for the same $N_e$, $\rho_v$ in the EGR setting map for the NOx reduced driving mode or the theoretical ratio driving mode.

Figure 18:
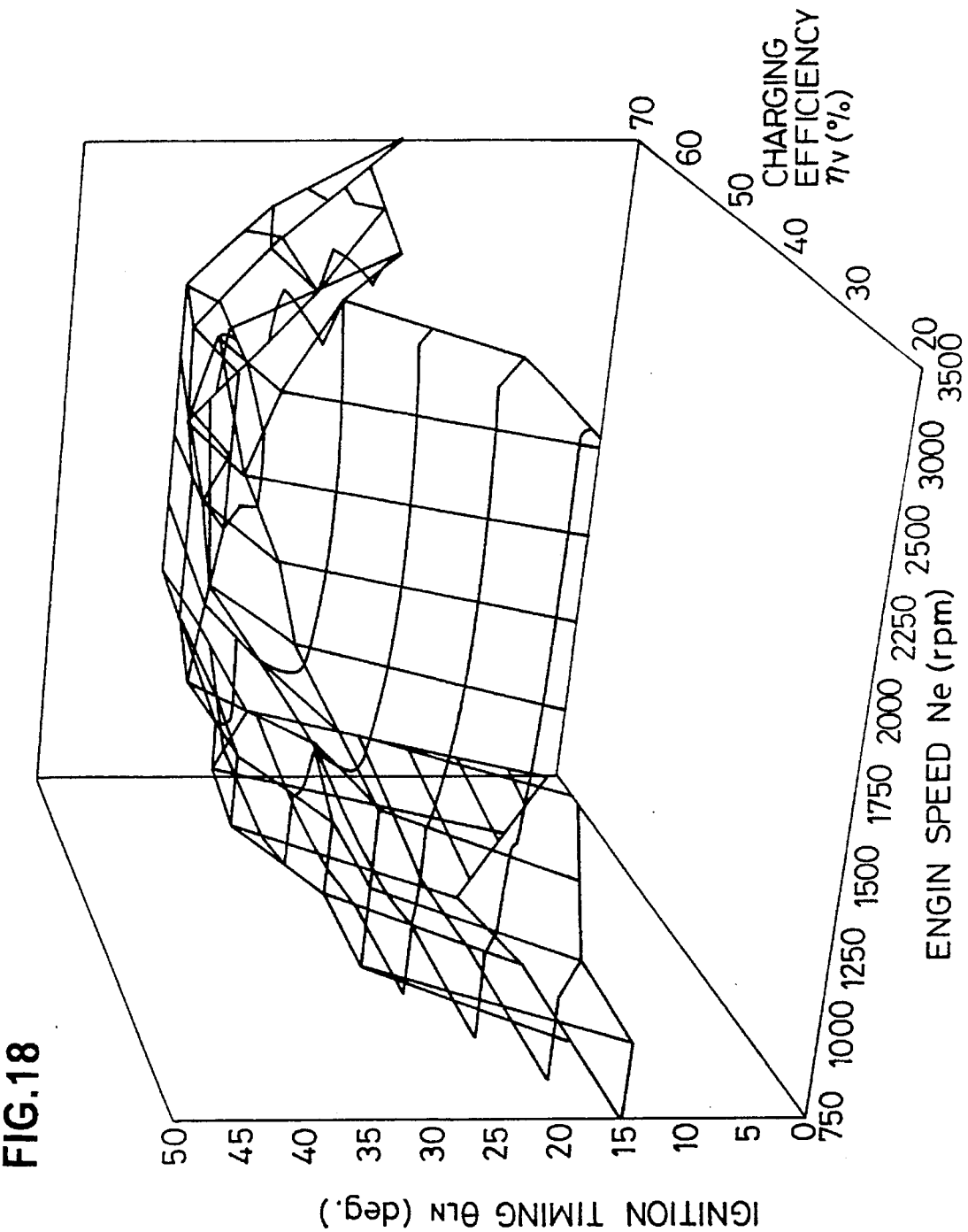
FIG. 18 is a graph showing, by way of example, an ignition timing map for the normal lean-combustion driving, which is used in the combustion controlling routine.

At the next step S42, an ignition timing $\theta_{LN}$ is read from an ignition timing map (FIG. 18), previously stored in the ECU 23 for the normal lean-combustion driving, as the ignition timing $\theta_{Ig}$ for the normal lean-combustion driving according to the engine speed $N_e$ and the charging efficiency $\rho_v$ of the air-fuel mixture. In the map, the ignition timing $\theta_{LN}$ is expressed as a function of the engine speed $N_e$ and the charging efficiency $\rho_v$ of the air-fuel mixture ($\theta_{Ig}=\theta_{LN}(N_e, \rho_v)$). Since the ignition timing must be advanced to improve the combustion efficiency at the time of normal lean-combustion driving, the ignition timing $\theta_{LN}$ in this ignition timing map is set to a value on the advancing side from the ignition timings $\theta_{NO}$, $\theta_{ST}$ for the same $N_e$, $\rho_v$ for the NOx reduced driving and theoretical ratio driving.

After setting the ignition timing $\theta I_{Ig}$, the control flow proceeds to the step S44. At the step S44, the acceleration determining threshold value $A_{th}$ is set to a reference threshold value $A_O$ which is larger than the threshold value $A_{NO}$ for the NOx reduced driving ($A_O > A_{NO}$). During the normal lean-combustion driving, therefore, a shift to the theoretical ratio driving mode does not take place unless the throttle valve 7 is more rapidly opened than in the NOx reduced driving mode. This is because the engine output in the normal lean-combustion mode is higher than that in the NOx reduced driving mode, and hence it is possible to fully cope with a considerably urgent acceleration driving demand, even if the theoretical ratio driving is not carried out. Another reason is to prevent the driving mode from being frequently changed into the theoretical ratio driving mode, to thereby prevent the lowering of fuel economy.

Next, the control flow proceeds to the step S36 in which the amount of fuel is calculated properly based on the intake air amount and the air-fuel ratio in a conventional manner. Whereupon execution of the combustion control routine in the present cycle is completed. Then, if a next crank angle synchronization signal $\theta_{CR}$ is supplied to the ECU 23, the combustion control routine is started again from the step S10.

If it is determined at the step S10 that the theoretical ratio driving condition is not satisfied and if it is determined at the step S16 that the estimated value $Q_{NT}$ of the catalyst-discharge NOx amount has not reached the threshold value $Q_{NTO}$, a sequence of steps S10, S11, S12, S14, S16, S40, S42, S44 and S36 is repeatedly executed to drive the engine 1 in the normal lean-combustion mode. During this time, NOx in the exhaust gases is adsorbed on the NOx catalyst 13a.

Thereafter, if it is determined at the step S16 that the estimated value $Q_{NT}$ of the catalyst-discharge NOx amount has exceeded the threshold value $Q_{NTO}$ during the lean-combustion driving, and hence the result of determination at the step S16 becomes "YES", it is determined that the NOx adsorbing ability of the NOx catalyst 13a is saturated. In this case, the control flow proceeds to the step S18. At the step S18, the value of a flag f(NR) is set to "1" indicating that the NOx reduced driving is being effected.

Next, the control flow proceeds to the step S30 of FIG. 4. At the step S30, according to the engine speed $N_e$ and the charging efficiency $\rho_v$ of the air-fuel mixture, an EGR amount $E_{NO}$ is read out, as an EGR amount $E_{gr}$ for NOx reduced driving, by the temperature lowering unit 36 of FIG. 1 from an EGR setting map (not shown) for NOx reduced driving. This map has been empirically determined and stored in the ECU 23.

In the map for NOx reduced driving, the EGR amount $E_{NO}$ is expressed as a function of the engine speed $N_e$ and the charging efficiency $\rho_v$ of the air-fuel mixture ($E_{gr}=E_{NO}(N_e, \rho_v)$), and is set to a value larger than the EGR amount $E_{gr}$ for the same $N_e$, $\rho_v$ in the EGR setting map (FIG. 17) for normal lean-combustion driving. Therefore, the EGR amount $E_{gr}$ circulated from the exhaust manifold 11 to the intake manifold 4 becomes larger than in the case of normal lean-combustion driving, thereby lowering the combustion temperature and reducing the NOx discharge amount.

After setting the EGR amount $E_{gr}$, the control flow proceeds to the step S32. At the step S32, according to the engine speed $N_e$ and the charging efficiency $\rho_v$ of the air-fuel mixture, an ignition timing $\theta_{NO}$ is read out, as an ignition timing $\theta_{Ig}$ for NOx reduced driving, from an ignition timing setting map (not shown) for NOx reduced driving, which map has been empirically determined and previously stored in the ECU 23.

In the ignition timing setting map (not shown) for NOx reduced driving, the ignition timing $\theta_{NO}$ is expressed as a function of the engine speed $N_e$ and the charging efficiency $\rho_v$ of the air-fuel mixture ($\theta_{Ig}=\theta_{NO}(N_e, \rho_v)$), and set to a value on the lag side from the ignition timing $\theta_{Ig}$ for the same $N_e$, $\rho_v$ in the ignition timing map (FIG. 18) for normal lean-combustion driving. Therefore, the timing for the ignition plug 16 to ignite the air-fuel mixture is delayed, so that the exhaust stroke is started before the combustion is completed. Thus, the combustion temperature will not be raised so high, and the NOx discharge amount is reduced.

After setting the ignition timing $\theta_{Ig}$, the control flow proceeds to the step S34. At the step S34, according to an acceleration determination threshold setting map (not shown) for NOx reduced driving, the valve opening speed threshold value (acceleration determination threshold value) $A_{th}$ of the throttle valve 7 is changed to the NOx reduced acceleration determination threshold value $A_{NO}$ by the threshold value changing unit 38. In this map, the threshold value $A_{NO}$, which is expressed as a function of vehicle speed, is set to a value smaller than the normal threshold value $A_O$. Therefore, the changeover from the lean-combustion driving to the theoretical ratio driving is effected on the low throttle valve opening speed side. As a result, if an acceleration driving demand is issued during the NOx reduced driving, the engine output, which is lowered by a lowering of the combustion efficiency caused by the NOx reduced driving, is rapidly increased, thereby making the acceleration driving smooth.

After setting the acceleration determining threshold $A_{th}$, the control flow proceeds to the step S36. At the step S36, the amount of fuel to be supplied from the fuel injection valve 3 is calculated in a conventional manner based on the intake air amount and the air-fuel ratio in accordance with a predetermined equation. The amount of fuel supplied during the NOx reduced driving is maintained at a constant value when the air-fuel ratio is kept at a predetermined value. When the air-fuel ratio is changed within the lean air-fuel ratio range to thereby lower the combustion temperature, on the other hand, the fuel supply amount is variably adjusted according to the EGR amount $E_{NO}$ and ignition timing $\theta_{NO}$.

When the calculation for the amount of fuel supply at the step S36 is completed, execution of the combustion control routine in the present cycle is completed. After this, if a next crank angle synchronization signal $\theta_{CR}$ is supplied to the ECU 23, the combustion control routine is started again from the step S10.

Since the flag f(NR) is already set to "1" after the start of the NOx reduced driving, a sequence of steps S10, S11, S12, S30, S32, S34 and S36 is repeatedly carried out to effect the NOx reduced driving, if it is determined at the step S10 that the theoretical ratio driving condition is not satisfied.

As described above, according to the engine combustion control of this embodiment, even when the catalyst-discharge NOx estimated amount $Q_{NT}$ reaches the predetermined value $Q_{NTO}$ at which the NOx adsorption amount may be considered to be substantially saturated during the lean-combustion driving, there occurs no possibility that the driving mode is forcibly changed from the lean-combustion driving to the theoretical ratio driving to deoxidize the adsorbed NOx. Instead, in the engine combustion control of this embodiment, when the NOx catalyst 13a is saturated, the NOx reduced driving in which the EGR amount is increased and the ignition timing is delayed, is effected. As a result, the amount of NOx discharged into atmosphere can always be maintained at a value equal to or smaller than the constant value $Q_{NTO}$, without causing a torque variation due to the changeover to the theoretical ratio driving mode.

Further, since the acceleration determining threshold value $A_{th}$ is set to a small value in the NOx reduced driving mode so that the driving mode tends to be changed into the theoretical ratio driving mode, usually, the NOx reduced driving is not maintained for a long period of time. Therefore, a lowering of the fuel economy caused by the NOx reduced driving can be suppressed within a permissible range.

During the normal lean-combustion driving or the lean-combustion driving for NOx reduction, if it is determined at the step S10 that the theoretical ratio driving condition is satisfied and thus the result of the determination at the step S10 becomes "YES", the control flow proceeds to the step S20. At the step S20, the air-fuel ratio is changed from the lean air-fuel ratio to the theoretical air-fuel ratio, thereby changing the driving mode from the lean-combustion mode to the theoretical ratio driving mode.

At the next step S22, the flag f(NR) is set to "0" indicating that the NOx reduced driving is not effected. This is because the NOx reduced driving is inhibited in the theoretical ratio driving mode as will be described later. Further, at the step S22, a timer counter for counting the elapse time from the moment at which the theoretical ratio driving begins is started. At the next step S24, whether or not a predetermined time $t_R$ (for example, 3 seconds) has elapsed from the start of the theoretical ratio driving is checked by referring to the content of the timer counter. If the result of the determination at the step S24 is "NO", the control flow proceeds to the step S50 of FIG. 4.

At the step S50, according to the engine speed $N_e$ and the charging efficiency $\rho_v$ of the air-fuel mixture, an EGR amount $E_{ST}$ is read as the EGR amount $E_{gr}$ for theoretical ratio driving from an EGR amount setting map (not shown) for theoretical ratio driving previously stored in the ECU 23. In this map, the theoretical air-fuel ratio EGR amount $E_{ST}$ is expressed as a function of the engine speed $N_e$ and the charging efficiency $\rho_v$ of the air-fuel mixture ($E_{gr}=E_{ST}(N_e, \rho_v)$), and set to a value larger than the EGR amount $E_{gr}$ for the same $N_e$, $\rho_v$ in the EGR amount setting map (FIG. 17) for normal lean-combustion driving. Therefore, the EGR amount $E_{gr}$ in the theoretical ratio driving becomes larger than the EGR amount in the normal lean-combustion driving, thereby lowering the combustion temperature and reducing the NOx discharge amount.

After setting the EGR amount $E_{gr}$, the control flow proceeds to the step S52. At the step S52, an ignition timing $\theta_{ST}$ is read as the ignition timing $\theta_{Ig}$ for theoretical ratio driving from an ignition timing map (not shown) for theoretical ratio driving previously stored in the ECU 23 according to the engine speed $N_e$ and the charging efficiency $\rho_v$ of the air-fuel mixture. In the above map, the ignition timing $\theta_{ST}$ is expressed as a function of the engine speed $N_e$ and the charging efficiency $\rho_v$ of the air-fuel mixture ($\theta_{Ig}=\theta_{ST}(N_e, \rho_v)$), and set to a value on the lag side from the ignition timing $\theta_{Ig}$ for the same $N_e$, $\rho_v$ in the ignition timing map (FIG. 18) for normal lean-combustion driving or that for NOx reduced driving. Therefore, since the timing for the ignition plug 16 to ignite the air-fuel mixture is delayed, the exhaust stroke is started before the combustion is completed, thereby reducing the NOx discharge amount. Further, a knocking prevention effect can also be attained in the theoretical ratio driving.

At the next step S44, the acceleration determining threshold value $A_{th}$ is reset from the threshold value $A_{NO}$ for NOx reduced driving to the reference threshold value $A_O$ larger than the threshold value $A_{NO}$. Then, in the next step S36, the amount of fuel to supply is calculated. After completion of the fuel supply amount calculation at the step S36, execution of the combustion control routine in the present cycle is ended. Then, if a next crank angle synchronization signal $\theta_{CR}$ is supplied to the ECU 23, the combustion control routine is started again from the step S10.

After starting the theoretical ratio driving, a sequence of steps S10, S20, S22, S24, S50, S52, S44 and S36 is repeatedly executed to effect the theoretical ratio driving until the predetermined time $t_R$ has elapsed. In the theoretical ratio driving, the exhaust gas contains plenty of HC, and hence the reducing atmosphere is created around the NOx catalyst 13a. As a result, NOx adsorbed by the NOx catalyst 13a is reduced or deoxidized.

Thereafter, if the predetermined time $t_R$ has elapsed from the start of the theoretical ratio driving and hence the result of the determination at the step S24 becomes "YES", the control flow proceeds to the step S26. At the step S26, it is determined that reduction or deoxidization of the adsorbed NOx is sufficiently effected, and the accumulated value $SQ_{N(i+1)}$ of the engine-discharge NOx amount is reset to a value of "0". Then, steps S50, S52, S44 and S36 are executed in sequence.

In the next and subsequent control cycles, the theoretical ratio driving is effected so long as the theoretical ratio driving condition is satisfied. If the condition is not satisfied, a shift is made to the lean-combustion driving.

Next, a combustion control method for an internal combustion engine according to a second embodiment of this invention is explained.

A combustion control apparatus embodying the method of the second embodiment can be formed with the same construction as the apparatus of FIG. 1, and therefore, the explanation of the apparatus is omitted.

Figure 11:
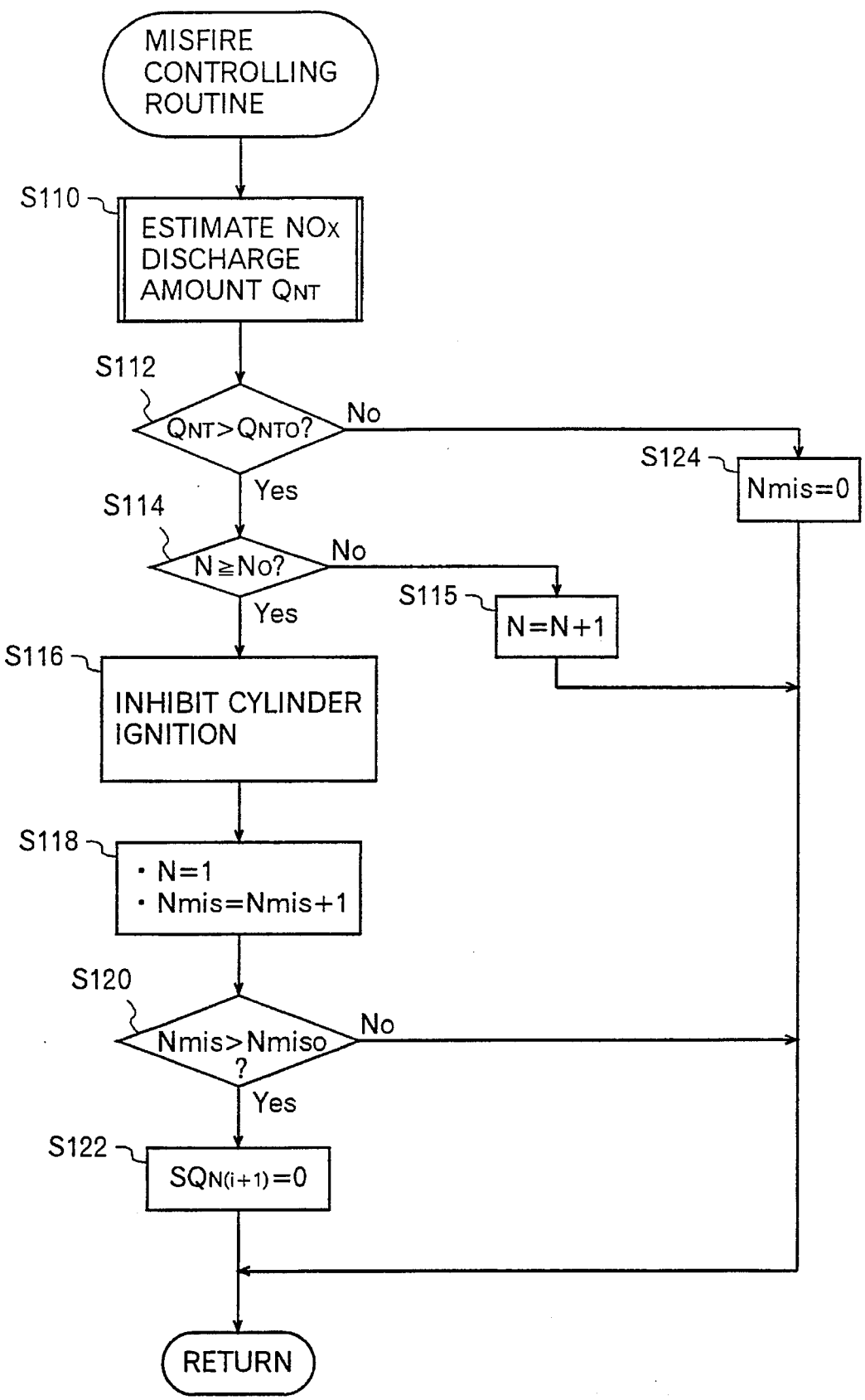
FIG. 11 is a flowchart of the misfire controlling routine executed in a combustion controlling method for an internal combustion engine according to a second embodiment of this invention.

In this embodiment, each time a crank angle synchronization signal $\theta_{CR}$ is supplied to the ECU 23 as an interrupt signal during the driving of an engine 1, the combustion control (misfire control) routine shown in FIG. 11 is executed by the ECU 23. The combustion control of this routine determines whether to deteriorate the combustion state when the NOx adsorbing ability of the catalyst 13a substantially reaches the saturated state during the lean-combustion driving by inhibiting the ignition of an air-fuel mixture introduced into a predetermined one of the cylinders of the engine 1 at intervals of a predetermined cycle. This will intermittently cause a misfire, whereby a reducing atmosphere is created around the NOx catalyst 13a by unburnt HC contained in the unburnt gases produced at this time, so as to reduce (deoxidize) and eliminate adsorbed NOx in the reducing atmosphere.

Figure 6:
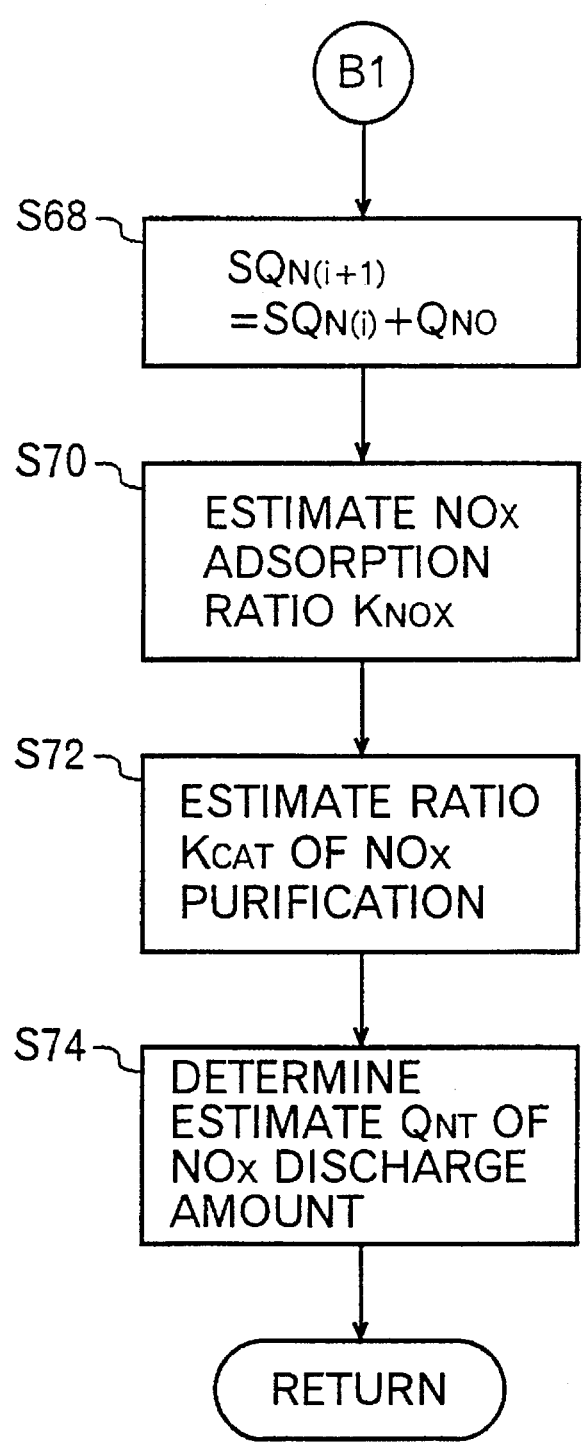
FIG. 6 is the remaining part of the flowchart of the NOx discharge amount $Q_{NT}$ calculating sub-routine following the flowchart of FIG. 5.

First, at the step S110, an estimated value $Q_{NT}$ of the catalyst-discharge NOx amount is calculated by the ECU 23. Like the first embodiment, the sub-routine shown in FIGS. 5 and 6 is effected. The sub-routine is already explained, and therefore, explanation therefor is omitted.

After the estimated value $Q_{NT}$ of the catalyst-discharge NOx amount is calculated, the control flow proceeds to the step S112 of FIG. 11. At the step S112, whether or not the estimated value $Q_{NT}$ of the catalyst-discharge NOx amount calculated as described above is larger than a predetermined threshold value $Q_{NTO}$ is determined by the comparator 34 of the adsorption saturation determining unit 32. If it is determined at the step S112 that the NOx adsorption amount has not reached the saturated state, and hence the result of determination at the step S112 becomes "NO", it is determined that the amount of NOx discharged into the atmosphere is equal to or less than a maximum permissible value.

In this case, the control flow proceeds to the step S124 and the number of times $N_{mis}$ of misfire (hereinafter referred to as misfire number $N_{mis}$) is set to "0". This is because the misfire control which will be described later has not yet started. Then, the combustion control routine in the present cycle is completed. If a next crank angle synchronization signal $\theta_{CR}$ is supplied to the ECU 23, the misfire control routine is started again from the step S110.

As described above, if it is determined at the step S112 that the NOx catalyst 13a is not saturated with adsorbed NOx, the normal engine driving is effected.

If it is determined at the step S112 that the estimated value $Q_{NT}$ of the NOx discharge amount is larger than the threshold value $Q_{NTO}$ and hence the result of determination at the step S112 becomes "YES", it is determined that the adsorbing ability of the NOx catalyst 13a has reached the saturated state. In this case, the control flow proceeds to the step S114. At the step S114, a determination is made as to whether or not the number of times the misfire control routine has been effected, i.e., the number of times N the crank angle synchronization signals $\theta_{CR}$ has been generated (hereinafter referred to as $\theta_{CR}$ generation number N) after the first time that the estimated NOx discharge amount $Q_{NT}$ exceeded the threshold value or after inhibition of ignition for misfire, $Q_{NTO}$ has reached a predetermined number of times $N_O$ (which is 50, for example, and is hereinafter referred to predetermined number $N_O$) which corresponds to a predetermined misfire period.

If it is determined at the step S114 that the $\theta_{CR}$ generation number N has not reached the predetermined number of times $N_O$ and hence the result of determination at the step S114 becomes "NO", the control flow proceeds to the step S115 in which a value of "1" is added to the $\theta_{CR}$ generation number N, and then the combustion control routine in the present cycle is completed.

If the result of determination at the step S112 is "NO", a sequence of steps S110, S112, S114 and S115 is repeatedly effected. Thereafter, the $\theta_{CR}$ generation number N reaches the predetermined number $N_O$, and the result of the determination at the step S114 becomes "YES". In this case, it is determined that the timing at which the ignition is to be inhibited has been reached, and the control flow proceeds to the step S116. At the step S116, the ECU 23 does not supply the ignition unit 24 with a voltage supply command associated with the ignition plug 16 of a predetermined one of the cylinders (for example, the first cylinder). As a result, the ignition in this cylinder is inhibited, thus causing a misfire. Therefore, the air-fuel mixture in the associated combustion chamber 15 is not burnt and is discharged as unburnt gases from the exhaust port 10 towards the NOx catalyst 13a. As a result, a reducing atmosphere is created around the NOx catalyst 13a by unburnt HC contained in the unburnt gases, and the adsorbed NOx is deoxidized in the reducing atmosphere.

At the next step S118, the $\theta_{CR}$ generation number N is reset to "1" and a value of "1" is added to the misfire number $N_{mis}$. Further, at the step S120, whether or not the misfire number $N_{mis}$ exceeds a predetermined value $N_{misO}$ is determined. The predetermined value $N_{misO}$ is set beforehand to that number of misfire (for example, 50) which can be regarded as sufficient to deoxidize NOx adsorbed by the NOx catalyst 13a. If the result of the determination at the step S120 is "NO" and thus it is determined that NOx adsorbed on the NOx catalyst 13a is not fully oxidized, the combustion control routine in the present cycle is completed.

If the result of determination at the step S114 is "NO", the sequence of steps S110, S112, S114 and S115 is repeatedly effected. Thereafter, if the $\theta_{CR}$ generation number N has reached the predetermined number $N_O$ and the result of determination at the step S114 becomes "YES", an intermittent ignition failure is caused (step S116).

As described above, the misfire driving or ignition-failure driving is intermittently effected. If the misfire number $N_{mis}$ caused by the intermittent misfire driving exceeds the predetermined value $N_{misO}$, the result of the determination at the step S120 becomes "YES". In this case, it can be considered that a period of time necessary for fully oxidizing NOx adsorbed on the NOx catalyst 13a has elapsed. Therefore, it can be considered that NOx is completely eliminated from the NOx catalyst 13a, and the NOx adsorbing ability of the NOx catalyst 13a is recovered. Thus, the control flow proceeds to the step S122. At the step S122, the accumulated value $SQ_{N(i+1)}$ of the engine-discharge NOx amount is reset to "0", which value is used for the estimated NOx discharge amount $Q_{NT}$ calculation at the step S110.

As a result, the estimated NOx adsorption ratio $K_{NOX}$ is set to 1.0 when the sub-routine shown in FIGS. 5 and 6 is executed again at the step S110 in the next misfire control routine execution cycle. Therefore, the estimated value $Q_{NT}$ of catalyst-discharge NOx amount calculated at the step S110 in the next misfire control routine execution cycle becomes "0". Therefore, the result of the determination in the next step S112 becomes "NO", the control flow proceeds to the step S124, and the misfire driving is ended.

As described in detail above, in this embodiment, each time the estimated value $Q_{NT}$ of the catalyst-discharge NOx amount has exceeded the threshold value $Q_{NTO}$, ignition associated with a predetermined one of the cylinders is inhibited a predetermined number of times at intervals of a predetermined cycle. As a result, unburnt gases containing unburnt HC are intermittently supplied to the NOx catalyst 13a, whereby adsorbed NOx is deoxidized, and the NOx adsorbing ability of the NOx catalyst 13a is adequately recovered. Further, a stabilized lean-combustion driving state of the engine 1 can be maintained.

In addition, it is unnecessary to increase the amount of fuel supplied in order to supply the unburnt HC. Therefore, a rapid change in the engine output due to an increase in the amount of fuel supplied, and hence deterioration in the drive feeling will not occur. Further, fuel economy is not lowered.

During the intermittent misfire driving or ignition-failure driving, the engine 1 is driven with the lean air-fuel ratio, and the exhaust gases discharged from the engine 1 contain a large amount of oxygen. Therefore, unburnt gases which are caused by the misfire and which are not used for deoxidization of NOx are fully oxidized by the three-way catalytic converter 13b, and will not be discharged into the atmosphere.

A combustion control method for an internal combustion engine according to a third embodiment of this invention is explained below.

The method of this embodiment has a feature that the air-fuel ratio is set to an air-fuel ratio (over-lean air-fuel ratio) leaner than the air-fuel ratio corresponding to the limit of combustion, to thereby cause a misfire. A combustion control apparatus embodying the method of the third embodiment can be formed with the same construction as the apparatus of FIG. 1, and therefore, the explanation of the apparatus is omitted.

Figure 12:
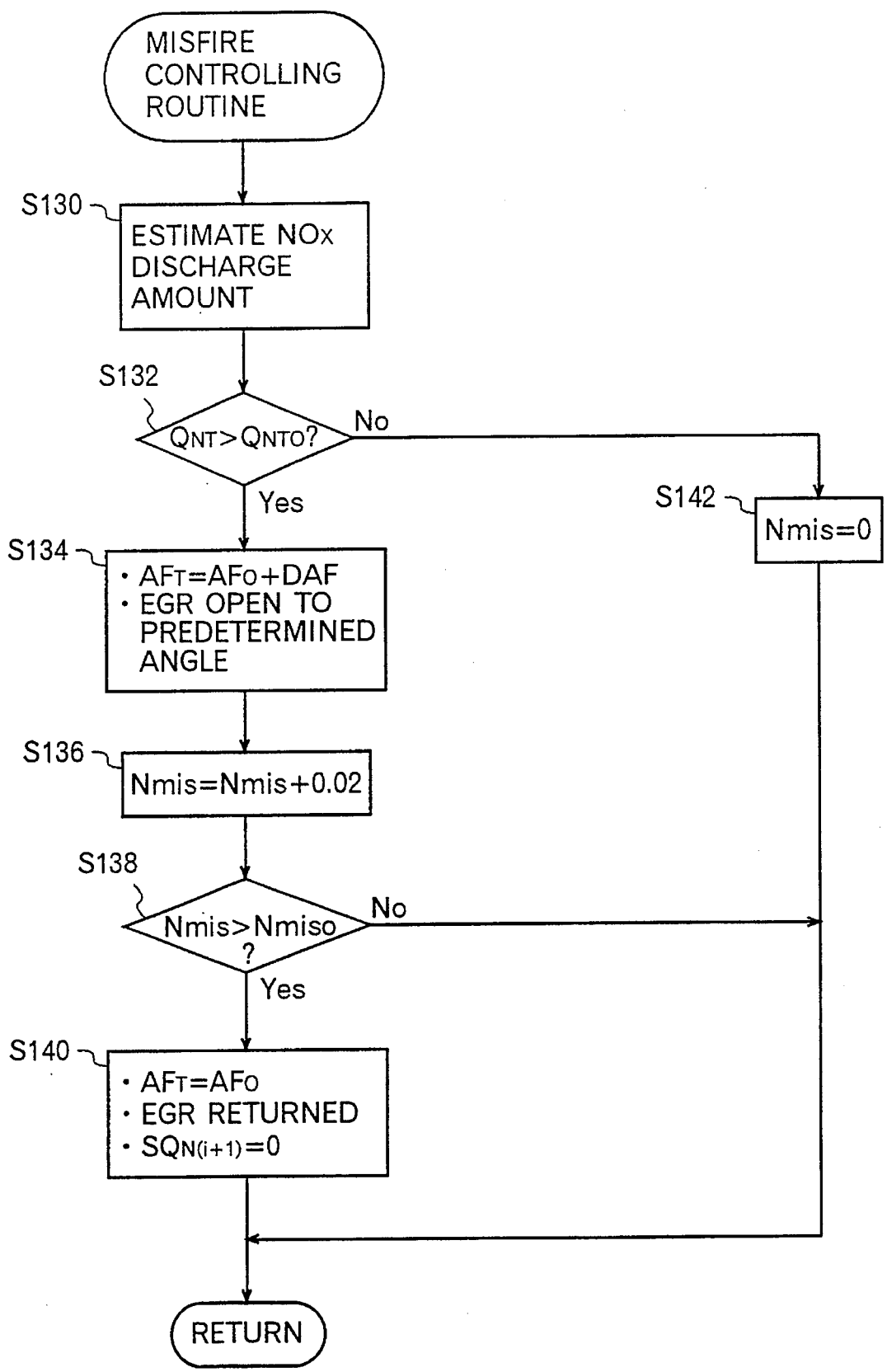
FIG. 12 is a flowchart of the misfire controlling routine executed in a combustion controlling method for an internal combustion engine according to a third embodiment of this invention.

In this embodiment, each time a crank angle synchronization signal $\theta_{CR}$ is supplied to the ECU 23 during the driving of an engine 1, the combustion control (misfire control) routine shown in FIG. 12 is executed by the ECU 23.

First, at the step S130 corresponding to the step S110 of FIG. 11, the sub-routine shown in FIGS. 5 and 6 is executed by the NOx estimating unit 33, to calculate an estimated value $Q_{NT}$ of the catalyst-discharge NOx amount. Then, at the step S132 corresponding to the step S112 of FIG. 11, whether or not the estimated value $Q_{NT}$ of the catalyst-discharge NOx amount has exceeded a predetermined threshold value $Q_{NTO}$ is determined by the comparator 34 of the adsorption saturation determining unit 32.

When the result of the determination at the step S132 is "NO", the step S142 corresponding to the step S124 of FIG. 11 is effected to reset the misfire number $N_{mis}$ to "0" and the combustion control routine in the present cycle is ended.

On the other hand, if the result of determination at the step S132 is "YES", the control flow proceeds to the step S134, and the misfire driving is started under the control of the ECU 23.

More specifically, at the step S134, the air-fuel ratio of an air-fuel mixture supplied to a predetermined one cylinder (for example, first cylinder) is corrected according to the following equation (5), to set the air-fuel ratio to the over-lean air-fuel ratio $AF_T$:

$$AF_T = AF_O + D_{AF} \qquad (5)$$

where $AF_O$ is a target lean air-fuel ratio during the normal driving, and $D_{AF}$ is the correction value of the target ratio.

The over-lean air-fuel ratio $AF_T$ has a value set on the lean side with respect to the air-fuel ratio corresponding to the limit of combustion, and is set to such a value that may cause a misfire with a predetermined probability (for example, 0.02) when the air-fuel mixture of over-lean air-fuel ratio $AF_T$ is ignited by the ignition plug 16. If the over-lean air-fuel ratio $AF_T$ is set to an excessively large value, combustion will not occur at any time and the driving of the engine 1 cannot be maintained, thus causing a problem.

Therefore, in order to attain the adequate over-lean air-fuel ratio $AF_T$, the correction value $D_{AF}$ is determined empirically so as to cause the misfire with a predetermined probability (frequency), for example, to cause misfire once every 50 times of ignition.

When the over-lean air-fuel ratio $AF_T$ is set, under the control of the ECU 23, the amount of fuel injected from the fuel injection valve 3 is decreased to a value corresponding to the over-lean air-fuel ratio $AF_T$. As a result, the misfire occurs with a predetermined probability. When the misfire has occurred, unburnt gases are discharged towards the NOx catalyst 13a and NOx adsorbed by the catalyst 13a is deoxidized and removed by unburnt HC contained in the unburnt gases.

Further, at the step 134, the EGR valve 27 is opened by a predetermined angle. As a result, a predetermined amount of exhaust gases are circulated towards the intake port 2 side to reduce the amount of oxygen in the air-fuel mixture, thus making it easier to cause the misfire.

At the next step S136, a value of 0.02 equal to a predetermined probability of occurrence of misfire is added to the misfire number $N_{mis}$. Then, in the next step S138 corresponding to the step 120 of FIG. 11, whether or not the misfire number $N_{mis}$ exceeds a predetermined value $N_{misO}$ is determined. The predetermined value $N_{misO}$ is set to a value equal to the misfire number (for example, 50) at which NOx adsorbed on the NOx catalyst 13a may be considered to be regarded as being sufficiently deoxidized.

If the result of the determination at the step S138 is "NO", it is determined that NOx adsorbed on the NOx catalyst 13a is not fully deoxidized, and the control routine in the present cycle is ended. After this, if the misfire number $N_{mis}$ does not exceed the predetermined value $N_{misO}$, the misfire driving is continued.

On the other hand, if the misfire number $N_{mis}$ has exceeded the predetermined value $N_{misO}$ (50) and the result of the determination at the step S138 becomes "YES", it is determined that the period of misfire driving is sufficiently long and hence NOx adsorbed on the NOx catalyst 13a is fully deoxidized. In this case, the control flow proceeds to the step S140. At the step S140, the air-fuel ratio is set to the lean air-fuel ratio $AF_O$, and the EGR valve 27 is closed or returned to the normal opening position. Then, the accumulated value $SQ_{N(i+1)}$ of engine-discharge NOx amount used for calculation of the estimated NOx discharge amount $Q_{NT}$ at the step S130 is reset to "0", and the control routine in the present cycle is ended.

If the accumulated value $SQ_{N(i+1)}$ of engine-discharge NOx amount is thus reset to "0", the estimated value $Q_{NT}$ of catalyst-discharge NOx amount calculated at the step S130 (corresponding to the step S110) of the next misfire routine execution cycle becomes "0" as is explained at the step S110 of FIG. 11. Therefore, the result of the determination in the next step S132 becomes "NO". In this case, the misfire driving is ended and the control flow proceeds to the step S142, and the misfire number $N_{mis}$ is reset to "0".

Thus, each time the estimated value $Q_{NT}$ of catalyst-discharge NOx amount exceeds the threshold value $Q_{NTO}$, the air-fuel ratio of the air-fuel mixture supplied to the predetermined cylinder is set to the over-lean air-fuel ratio $AF_T$. As a result, the misfire occurs a predetermined number of times at a predetermined frequency, so that unburnt gases are intermittently supplied to the NOx catalyst 13a. Therefore, NOx adsorbed on the NOx catalyst 13a is fully deoxidized and removed, and the NOx adsorbing ability of the NOx catalyst 13a is recovered appropriately.

Further, like the case of the second embodiment, according to this embodiment, performing the misfire driving in which the misfire is caused a predetermined number of times at intervals of a predetermined cycle (at a predetermined frequency) for the predetermined cylinder, a sufficiently large amount of unburnt gas can be supplied to the NOx catalyst 13a without increasing the amount of fuel supplied. Therefore, the engine 1 can be stably maintained in the lean-combustion driving state without causing a rapid change in the engine output, and the NOx adsorbing ability of the NOx catalyst 13a can be recovered without deteriorating the drive feelings and the fuel economy.

Further, like the case of the second embodiment, unburnt gases which are generated by misfire and which are not used for deoxidization of NOx are fully oxidized by the three-way catalytic converter 13b and will not be discharged into atmosphere.

A combustion control apparatus for an internal combustion engine according to a fourth embodiment of this invention is explained below.

The apparatus of this embodiment is formed with substantially the same construction as the apparatus of FIG. 1, and therefore, the explanation for common components of both of the apparatuses is omitted. In this embodiment, the EGR circulating passage 26 and EGR valve 27 shown in FIG. 1 are not necessary.

Figure 13:
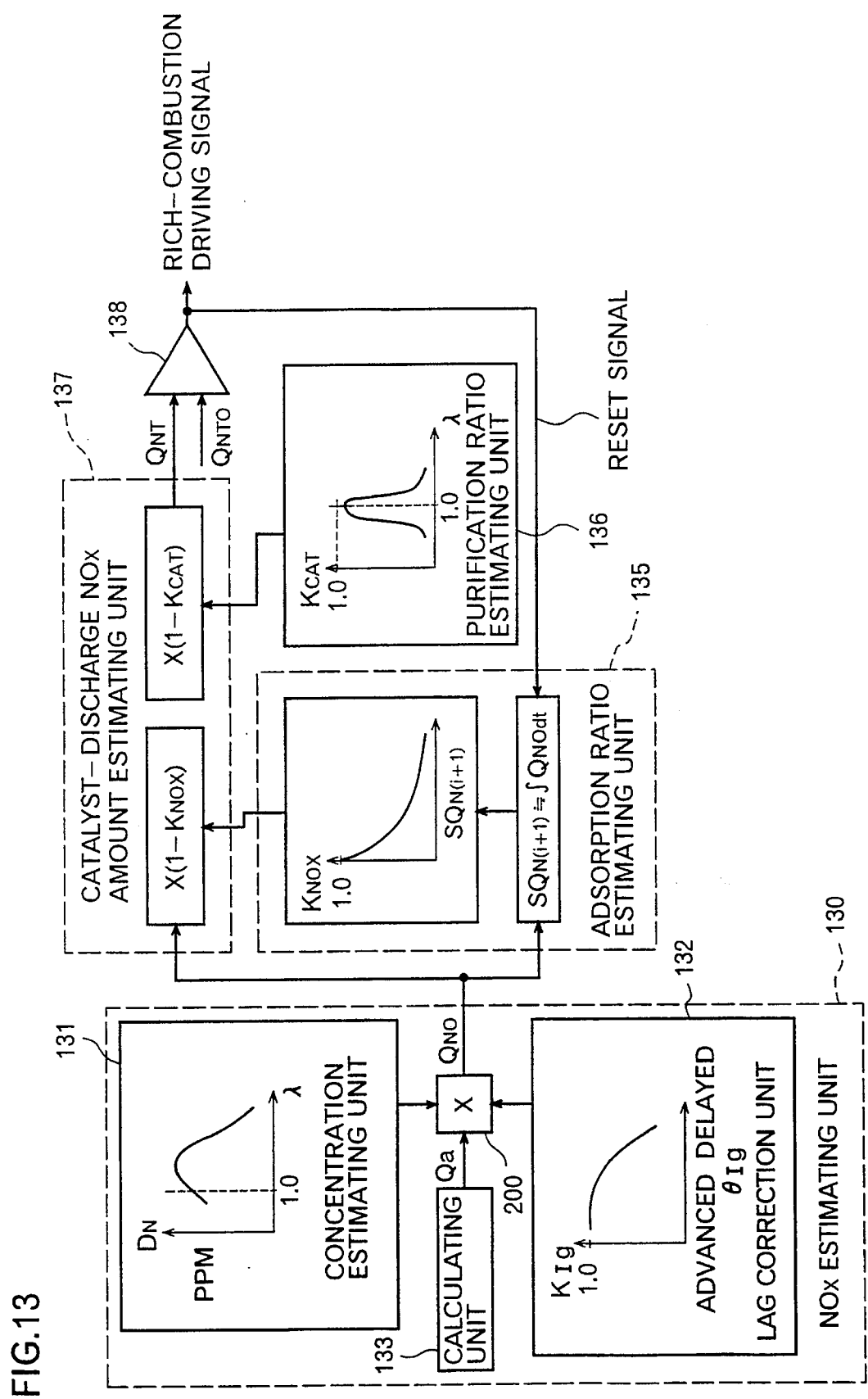
FIG. 13 is a functional block diagram of an electronic control unit of a combustion controlling apparatus for an internal combustion engine according to a fourth embodiment of this invention.

The ECU 23 in this embodiment functionally has various components shown in FIG. 13.

More specifically, the ECU 23 has engine-discharge NOx amount estimating unit 130 for estimating the discharge amount of NOx from the engine 1 to an exhaust pipe 14. The NOx estimating unit 130 includes engine-discharge NOx concentration estimating unit 131 for estimating the concentration $D_N$ of NOx discharged from the engine 1 to the exhaust pipe 14 according to the air excess ratio $\lambda$; lag correction unit 132 for deriving a correction coefficient $K_{Ig}$, which is used for correction of the estimated NOx concentration $D_N$, according to the ignition timing; and intake air amount calculating unit 133 for calculating the amount $Q_a$ of intake air supplied to the engine 1. In the NOx estimating unit 130, the product of intake air amount $Q_a$, estimated NOx concentration $D_N$ and correction coefficient $K_{Ig}$ is calculated by multiplies 200 as the estimated value $Q_{NO}$ of the engine-discharge NOx amount.

Further, the ECU 23 includes adsorption ratio estimating unit 135 for deriving the estimated value $K_{NOX}$ of the adsorption ratio of NOx by the NOx catalyst 13a according to the accumulated value $SQ_{N(i+1)}$ of the engine-discharge NOx amount; purification ratio estimating unit 136 for deriving the estimated value $K_{CAT}$ of the ratio of purification of NOx by the three-way catalytic converter 13b according to the air excess ratio $\lambda$; catalyst-discharge NOx amount estimating unit 137 for deriving the NOx discharge ratio based on the estimated NOx adsorption ratio $K_{NOX}$ and estimated NOx purification ratio $K_{CAT}$, and for deriving the product of the NOx discharge ratio and the estimated engine-discharge NOx amount $Q_{NO}$ as the estimated catalyst-discharge NOx amount $Q_{NT}$; and a comparator 138 for comparing the estimated catalyst-discharge NOx amount $Q_{NT}$ with the threshold value $Q_{NTO}$. If the estimated discharge amount $Q_{NT}$ is larger than the threshold value $Q_{NTO}$, a rich-combustion driving signal is output from the comparator 138. If the rich-combustion driving signal is output for a predetermined period of time $t_R$, a reset signal is output to the adsorption ratio estimating unit 135 so that the accumulated value $SQ_{N(i+1)}$ of engine-discharge NOx amount is reset to "0".

The above combustion control apparatus is designed to change the driving mode into the rich-combustion mode when the NOx adsorbing ability of the NOx catalyst 13a is substantially saturated during the lean-combustion driving, and maintain the rich-combustion driving for a predetermined period of time to put the NOx catalyst 13a in a reducing atmosphere so as to recover the adsorbing ability of the NOx catalyst 13a. The rich-combustion mode includes a driving mode in which the air-fuel ratio is feedback-controlled to substantially the theoretical air-fuel ratio.

The operation of the above combustion control apparatus is explained below.

Figure 14:
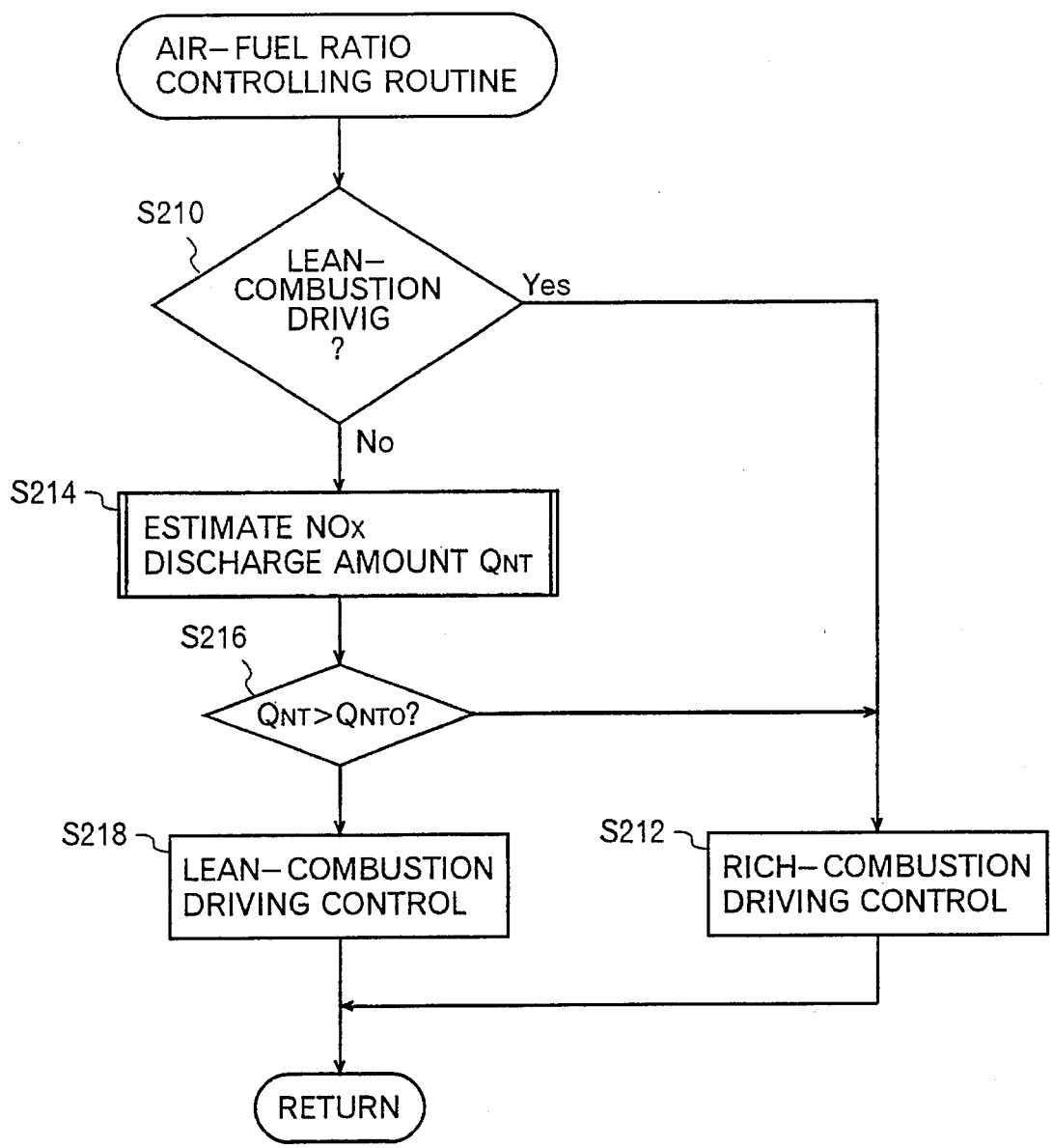
FIG. 14 is a flowchart of the air-fuel ratio controlling routine executed by the electronic control unit shown in FIG. 13.

Each time the crank angle synchronization signal $\theta_{CR}$ is supplied to the ECU 23 during the driving of the engine 1, the combustion control routine shown in FIG. 14 is executed.

First, whether or not the lean-combustion driving condition is satisfied is determined at the step S210. For example, the lean-combustion driving condition is satisfied when the following requirements and the like are simultaneously satisfied: the engine 1 is operated in the warming-up state; the engine 1 is driven in a predetermined driving range determined by the engine speed $N_e$ and engine load; and the engine 1 is not operated in a driving state in which the engine should be accelerated or decelerated.

If the result of the determination at the step S210 is "NO", that is, when the lean-combustion driving condition is not satisfied, the control flow proceeds to the step S212 and the rich-combustion driving control is carried out.

Figure 15:
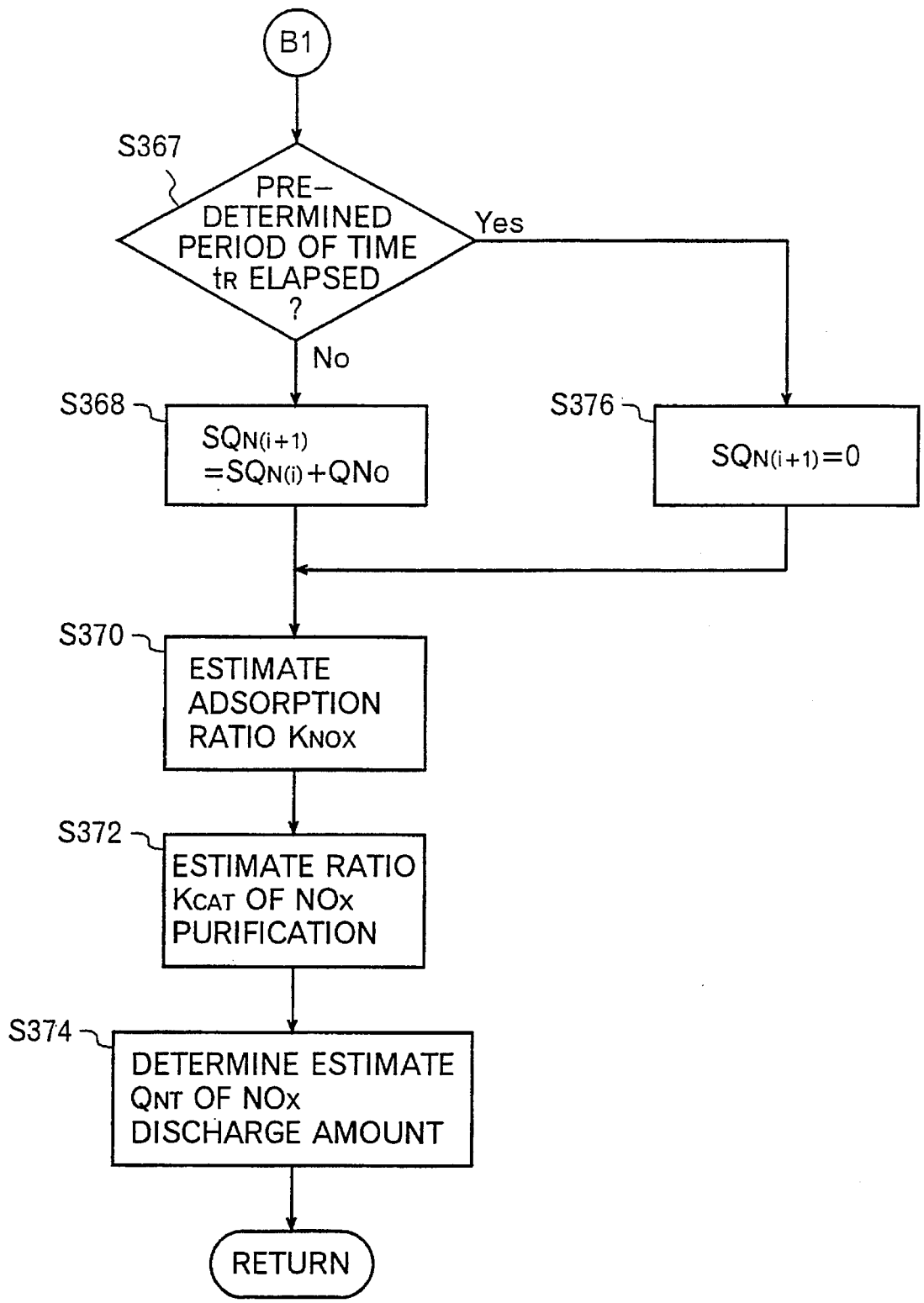
FIG. 15 is the remaining part of the flowchart of the estimated NOx discharge amount calculating subroutine following the flowchart of FIG. 5.

On the other hand, if the lean-combustion driving condition is satisfied and the result of determination at the step S210 is "YES", the control flow proceeds to the step S214 and the estimated value $Q_{NT}$ of the amount of NOx discharged from the exhaust purifying catalytic device 13 is derived. At the step S214, the subroutine containing the calculation process shown in FIG. 5 and a calculation process shown in FIG. 15 is executed. Since the calculation process shown in FIG. 5 is already explained, and most part of the calculation process shown in FIG. 15 corresponds to that shown in FIG. 6, the sub-routine is explained briefly below.

In this sub-routine, the estimated value $D_N$ of the engine-discharge NOx concentration is read from the map of FIG. 7 (step S60 of FIG. 5) according to the air excess ratio $\lambda$ by the concentration estimating unit 131 shown in FIG. 13. Further, the correction coefficient $K_{Ig}$ is read from the map of FIG. 8 according to the ignition timing by the lag correction unit 132 of FIG. 13 (step S62). Next, the intake air amount $Q_a$ for each cylinder is derived according to the engine speed $N_e$ and the detection value $A_f$ from the air flow sensor 6 by the intake air amount calculating unit 133 of FIG. 13 (step S64). Then, the engine discharge NOx amount $Q_{NO}$ for each detection of the crank angle synchronization signal $\theta_{CR}$ is calculated by use of the equation (1) according to the estimated NOx concentration $D_N$, correction coefficient $K_{Ig}$, and intake air amount $Q_a$ by the NOx amount estimating unit 130 of FIG. 13 (step S66).

After the calculation of the engine-discharge NOx amount $Q_{NO}$, the control flow proceeds to the step S367 of FIG. 15. At the step S367, whether a predetermined period of time $t_R$ (for example, 3 seconds) has elapsed from the start of the rich-combustion driving is determined During the lean-combustion driving, the result of the determination at the step S367 becomes "NO" and the control flow proceeds to the step S368 corresponding to the step S68 of FIG. 6. At the step S368, the accumulated value $SQ_{N(i+1)}$ of the engine discharge NOx amount $Q_{NO}$ is calculated by use of the equation (2).

At the next step S370 corresponding to the step S70 of FIG. 6, the estimated value $K_{NOX}$ of the adsorption ratio of NOx adsorbed by the NOx catalyst 13a at the time when the engine-discharge NOx passes the exhaust purifying catalytic device 13 is derived according to the accumulated value $SQ_{N(i+1)}$ of the engine-discharge NOx amount $Q_{NO}$ calculated at the step S368. The map of FIG. 9 is used for the estimation of the adsorption ratio $K_{NOX}$. Alternatively, the calculation by the equation (3) or the following regression equation is effected:

$$K_{NOX(i+1)} = 1 - (1 - K_{N1}) \times k_2 \times \{(1-\alpha) \times SQ_{N(i)} + \alpha \times Q_{N(i)}\}$$

where $\alpha$ is a constant.

At the next step S372 corresponding to the step S72 of FIG. 6, the estimated value $K_{CAT}$ of the purification ratio of NOx by the three-way catalytic converter 13b is read from the map of FIG. 10 based on the air excess ratio $\lambda$ by the purification ratio estimating unit 136 of FIG. 13. Instead of the estimation of the purification ratio $K_{CAT}$ using the map of FIG. 10, the purification ratio $K_{CAT}$ may be briefly determined according to whether the air excess ratio $\lambda$ is within or outside a narrow air excess ratio range, like the case of the first embodiment.

Further, at the step S374 corresponding to the step S74 of FIG. 6, the NOx discharge ratio is calculated by the catalyst-discharge NOx amount estimating unit 137 of FIG. 13 based on the estimated value $K_{NOX}$ of the ratio of adsorption of NOx by the NOx catalyst 13a and the estimated value $K_{CAT}$ of the NOx purification ratio by the three-way catalytic converter 13b. Further, the estimated value $Q_{NT}$ of the catalyst-discharge NOx amount for each detection of crank angle synchronization signal $\theta_{CR}$ is calculated according to the aforementioned equation (4) based on the NOx discharge ratio and the engine-discharge NOx amount $Q_{NO}$ calculated at the step S66 by the engine-discharge NOx amount estimating unit 130 of FIG. 13.

After the calculation of the estimated value $Q_{NT}$, the control flow proceeds to the step S216 of FIG. 14. At the step S216, whether or not the estimated value $Q_{NT}$ of the catalyst-discharge NOx amount is larger than a predetermined threshold value $Q_{NTO}$ is determined by the comparator 138 of FIG. 13. If the result of determination at the step S216 is "NO", it is determined that the amount of NOx discharged into the atmosphere is equal to or less than a maximum permissible value, and the control flow proceeds to the step S218 to effect the lean-combustion driving control.

On the other hand, if the result of the determination at the step S216 is "YES", that is, if the catalyst-discharge NOx amount $Q_{NT}$ is larger than the predetermined threshold value $Q_{NTO}$, the adsorbing ability of the NOx catalyst 13a is considered to be saturated. In this case, the control flow proceeds to the step S212 to effect the rich-combustion driving control.

If a change from the lean-combustion driving to the rich-combustion driving is made when the NOx amount $Q_{NT}$ becomes larger than the threshold value $Q_{NTO}$, the amount of HC discharged from the engine 1 becomes larger than in the lean-combustion mode. Then, the HC reacts with NOx to deoxidize NOx adsorbed by the NOx catalyst 13a. As a result, the amount of NOx discharged into the atmosphere is reduced, and it becomes possible for the NOx catalyst 13a to adsorb NOx again.

If it is determined for the first time at the step S216 that the NOx amount $Q_{NT}$ is larger than the threshold value $Q_{NTO}$ and a change to the rich-combustion driving control is made as described above, the timer counter of the ECU 23 is started at this time to start the operation of counting the elapse time from the start of the rich-combustion driving control.

As described above, if the NOx catalyst 13a is saturated with adsorbed NOx even when the lean-combustion driving condition is not satisfied, the rich-combustion driving is effected to deoxidize NOx. During this time, a sequence of steps S210, S214, S216 and S212 is repeatedly effected. If the result of determination at the step S367 of the sub-routine shown in FIGS. 5 and 15 and corresponding to the step S214 is "NO", that is, if a predetermined time $t_R$ does not elapse after the start of the rich-combustion driving control, the accumulated value $SQ_{N(i+1)}$ of the engine-discharge NOx amount is updated also in the S368. Therefore, it is determined at the step S216 that the catalyst-discharge NOx amount $Q_{NT}$ is still larger than the threshold value $Q_{NTO}$. As a result, the rich-combustion driving state is maintained for the predetermined time $t_R$, so that NOx will be fully deoxidized.

If the predetermined time $t_R$ has elapsed after the start of the rich-combustion driving control and the result of determination at the step S367 becomes "YES", the control flow proceeds to the step S376. At the step S376, it is regarded that all the NOx adsorbed on the NOx catalyst 13a is deoxidized, and a reset signal is output to the adsorption ratio estimating unit 135 of FIG. 13, thereby resetting the accumulated value $SQ_{N(i+1)}$ of the engine-discharge NOx amount to "0". As a result, the estimated value of the NOx adsorption ratio $K_{NOX}$ derived in the next step S370 becomes 1.0, and the estimated value $Q_{NT}$ of the catalyst-discharge NOx amount calculated at the step S374 becomes "0". In this case, the control flow proceeds to the step S218 to start the lean-combustion driving control again. That is, the rich-combustion driving control for deoxidization of NOx is ended.

Thereafter, if the estimated NOx adsorption ratio $K_{NOX}$ decreases again with an increase in the accumulated value $SQ_{N(i+1)}$ of the engine-discharge NOx amount, the estimated value $Q_{NT}$ of the catalyst-discharge NOx amount increases again.

Figure 16:
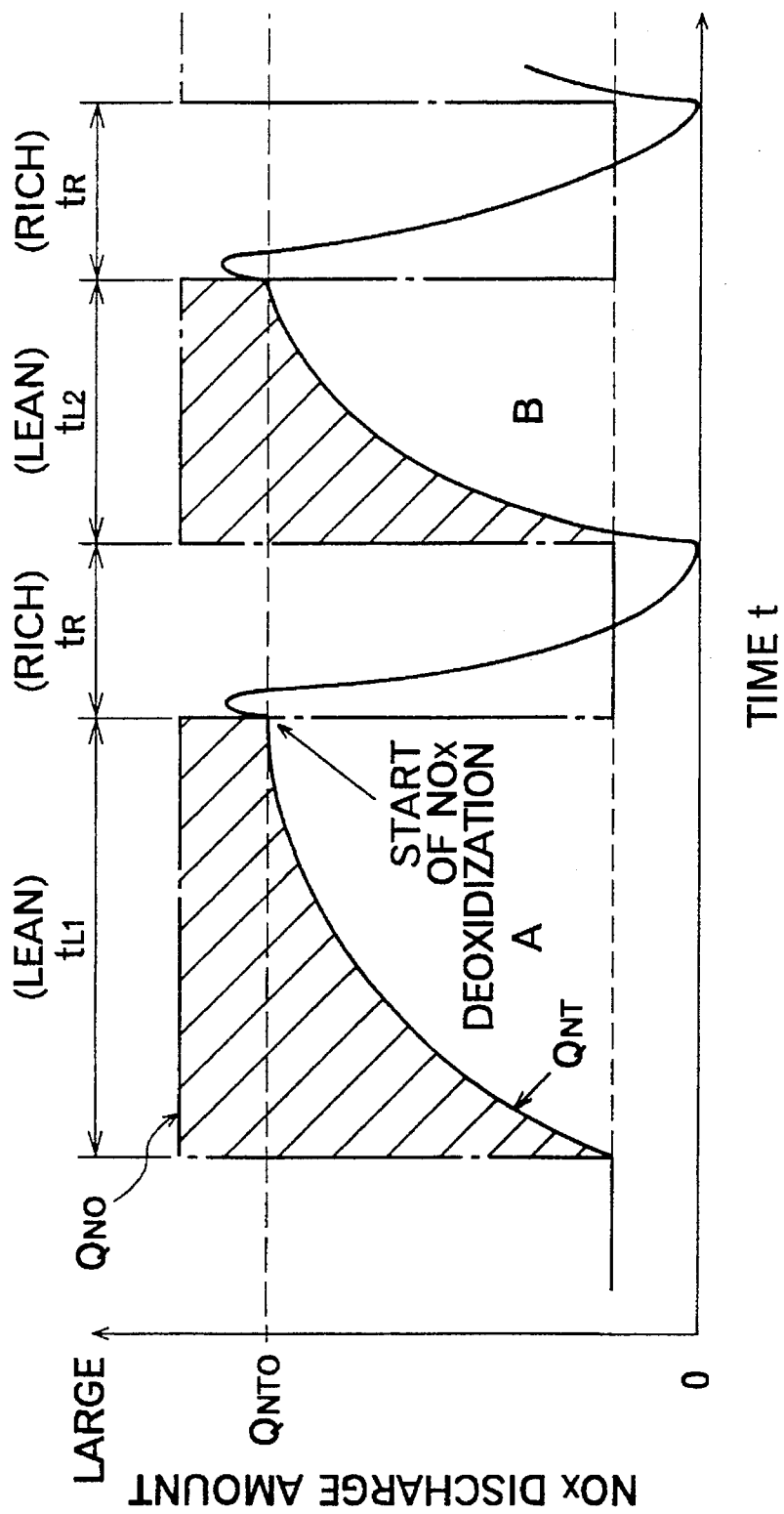
FIG. 16 is a graph showing changes in the amount $Q_{NO}$ of engine-discharge NOx and in the amount $Q_{NT}$ of catalyst-discharge NOx with elapse of time.

If the driving mode of the engine 1 is changed between the lean-combustion mode and the rich-combustion mode, the engine-discharge NOx amount $Q_{NO}$ and the catalyst-discharge NOx amount $Q_{NT}$ vary with elapse time as shown in FIG. 16. In FIG. 16, the one-dot-dash line indicates the engine-discharge NOx amount $Q_{NO}$, the solid line indicates the catalyst-discharge NOx amount $Q_{NT}$, and the hatched area indicates the NOx adsorption amount or purification amount by the exhaust purifying catalytic device 13.

As shown in FIG. 16, the NOx purification amount by the exhaust purifying catalytic device 13 decreases with elapse time during the lean-combustion driving. Then, if the estimated value $Q_{NT}$ of the catalyst-discharge NOx amount reaches the predetermined value $Q_{NTO}$ when a time period of, e.g., $t_{L1}$ has elapsed after the start of the lean-combustion driving, the engine driving mode is changed from the lean-combustion mode (A) to the rich-combustion mode. After this, the rich-combustion driving is maintained for the predetermined period of time $t_R$. During the rich-combustion driving, all the NOx adsorbed by the NOx catalyst 13a is deoxidized. Therefore, when the predetermined time $t_R$ has passed after the start of the rich-combustion driving and the lean-combustion mode (B) is set again, the NOx adsorbing ability of the NOx catalyst 13a is recovered.

Further, since a change from the lean-combustion mode to the rich-combustion mode is immediately made just after the catalyst-discharge NOx amount $Q_{NT}$ has reached the predetermined value $Q_{NTO}$, the amount of NOx discharged into atmosphere can always be suppressed equal to or less than the predetermined value $Q_{NTO}$. As exemplarily indicated by the duration $t_{L1}$ of the lean-combustion driving (A) and the duration $t_{L2}$ ($\neq t_{L1}$) of the lean-combustion driving (B), the duration t of the lean-combustion mode is not always constant. That is, in the driving state in which the NOx discharge amount is small, the lean-combustion driving is maintained for a relatively long period of time. Therefore, the frequency of changeover to the rich-combustion driving becomes small, thereby making it possible to suppress deterioration in the fuel economy and a variation in the torque. Further, in case that the engine driving is carried out in a manner that the engine driving region frequently changes among driving regions having different target air-fuel ratios, a changeover is made between the lean-combustion driving and the rich-combustion driving according to the driving state thus changed. Therefore, no problem will occur even if this invention is applied to such engine driving.

This invention is not limited to the aforementioned first to fourth embodiments, and various modifications can be made.

For example, in the first embodiment, the engine driving mode is changed from the lean-combustion mode to the theoretical ratio driving mode where the air-fuel fuel ratio is set to the theoretical air-fuel ratio, e.g., at the time of acceleration driving or heavy-load driving. Alternatively, changeover from the lean-combustion mode to the rich-combustion mode where the air-fuel ratio is set to be smaller than the theoretical air-fuel ratio may be performed.

Further, in the first embodiment, whether or not changeover to the NOx reduced driving should be made is determined according to the result of a comparison of the estimated value $Q_{NT}$ of the catalyst-discharge NOx amount (g/sec) with the threshold value $Q_{NTO}$. However, a determination as to whether or not changeover to the NOx reduced driving should be made can be carried out in accordance with the result of a comparison between an actually measured value or estimated value of the adsorbed amount of NOx by the NOx catalyst 13a and the saturated adsorption amount, or in accordance with the result of a determination associated with the discharge NOx concentration (PPM).

It is also possible to determine that the adsorption amount of NOx by the NOx catalyst 13a has reached the saturated value and effect the NOx reduced driving when a predetermined period of time has elapsed from the start of the lean-combustion driving. It is preferable to set the predetermined period of time such that the discharge NOx amount $Q_{NT}$ will not exceed the predetermined value $Q_{NTO}$.

Further, in the NOx reduced driving, the EGR amount is increased and the ignition timing is delayed in order to lower the combustion temperature. However, it is not always necessary to simultaneously effect both of the two operations, and only either one of these operations may be effected.

In the NOx discharge amount calculating sub-routine in the first embodiment, estimated values read from various maps are used. However, actually measured values corresponding to pieces of information supplied from various sensors can be used instead of the estimated values.

Further, in the first embodiment, acceleration determination (i.e., determination of the presence or absence of an acceleration driving demand) is made based on the opening speed of the throttle valve. Alternatively, the acceleration determination can be made based on an intake information variable such as a variation in the intake air amount or a variation in the negative pressure of intake air.

In the first embodiment, it is determined that the NOx catalyst 13a is saturated with adsorbed NOx when the catalyst-discharge NOx amount $Q_N$ has exceeded the threshold value $Q_{NTO}$. Instead of this, it is possible to accumulate pieces of load information on the engine (for example, amounts of fuel supplied to the engine 1) during the lean-combustion driving, derive the accumulated value thereof, and determine that the NOx catalyst 13a is saturated with adsorbed NOx when the accumulated value exceeds a predetermined value. In this modification, the ECU 23 performs the lean-combustion accumulation.

In the third embodiment, the air-fuel ratio is set to the over-lean air-fuel ratio $AF_T$ and a predetermined amount of exhaust gases is recirculated by EGR in order to cause misfire, but a sufficient effect can be attained only by setting the air-fuel ratio to the over-lean air-fuel ratio $AF_T$. Further, a misfire can be caused appropriately by simply recirculating the exhaust gases by EGR. In this case, it is preferable to set the recirculating amount of exhaust gases to a larger value.

In the second and third embodiments, the period during which the misfire driving continues is set based on the number of times $N_{mis}$ of misfire (i.e., the accumulated number of times of generation of crank angle synchronization signals $\theta_{CR}$). However, by taking into consideration that the $\theta_{CR}$ signal generation number is proportional to the accumulated number of revolutions of the engine 1, it is also possible to set the misfire occurrence period based on the accumulated number of engine revolutions, which is derived from the $\theta_{CR}$ signal generation number by using engine revolution number detector (for example, the ECU 23 which cooperates with the crank angle sensor 18 to function as the engine revolution number detector). Further, the misfire driving may be maintained until a predetermined time has elapsed after the start of the misfire driving.

Further, in the second and third embodiments, the misfire is caused in a predetermined one cylinder (for example, first cylinder), the misfire may be caused in a plurality of cylinders and the misfire may be sequentially caused in all of the cylinders under the control of the ECU 23.

Further, in the second and third embodiments, it is determined that the NOx adsorption amount has reached a saturated value when the NOx discharge amount $Q_{NT}$ has reached the threshold value $Q_{NTO}$. Alternatively, it is possible to determine that the NOx adsorption amount has reached the saturated value when the elapsed time from the start of the lean-combustion driving, which is measured by the timer counter in the ECU 23 has exceeds a predetermined time, or when the accumulated fuel injection amount during the lean-combustion driving exceeds a predetermined value.

In the fourth embodiment, the air-fuel ratio is set to substantially the theoretical air-fuel ratio in the rich-combustion driving control for deoxidizing adsorbed NOx, but it is only required to create a reducing atmosphere containing HC around the NOx catalyst 13*a*. Thus, the air-fuel ratio may be set to a value lying on the rich side with respect to the theoretical air-fuel ratio.

Further, in the fourth embodiment, whether or not changeover between the lean-combustion driving and the rich-combustion driving should be made is determined in accordance with the result of a comparison of the catalyst-discharge NOx amount $Q_{NT}$ with the threshold value $Q_{NTO}$. Alternatively, the necessity of changeover can be determined according to the result of a determination associated with discharge NOx concentration (PPM), etc.

In each of the above embodiments, estimated values derived from the various maps are used, but actually measured values can be used instead of the estimated values.

Furthermore, in each embodiment, a six-cylinder, inline gasoline engine is used, but the combustion control apparatus of this invention can be applied to any type of internal combustion engine, irrespective of the number of cylinders and the type thereof.

Further, the feature of the first to fourth embodiments may be combined as required.

From the above-described embodiments of the present invention, it is apparent that the present invention may be modified as would occur to one of ordinary skill in the art without departing from the spirit and scope of the present invention. All such modifications as would be obvious to one of ordinary skill in the art should not be regarded as a departure from the spirit and scope of the invention, and should be included within the scope of the following claims.

What is claimed is:

1. A control apparatus for an internal combustion engine having an exhaust purifying catalytic device disposed in an exhaust passage for reducing emission of nitrogen oxide to atmosphere, the exhaust purifying catalytic device being operable to adsorb nitrogen oxide contained in exhaust gases discharged from the internal combustion engine when the engine is in a lean-combustion mode where an air-fuel ratio of an air-fuel mixture supplied to the engine is leaner than a theoretical air-fuel ratio, and to deoxidize adsorbed nitrogen oxide when the internal combustion engine is in a rich-combustion mode where the air-fuel ratio is equal to or richer than the theoretical air-fuel ratio, comprising:

adsorption state estimating means including first nitrogen oxide discharge amount estimating means for estimating a discharge amount of nitrogen oxide from the exhaust purifying catalytic device, and said adsorption state estimating means estimating an adsorption state of nitrogen oxide adsorbed by the exhaust purifying catalytic device based on said estimated discharge amount of nitrogen oxide from the exhaust purifying catalytic device; and combustion-state deteriorating means for deteriorating a combustion state of the internal combustion engine according to the adsorption state of nitrogen oxide estimated by said adsorption state estimating means when the engine is in the lean-combustion mode.

2. A control apparatus according to claim 1, wherein said adsorption state estimating means includes adsorption saturation determining means for determining whether an amount of nitrogen oxide adsorbed by the exhaust purifying catalytic device has reached a saturation range; and said combustion-state deteriorating means deteriorates the combustion state of the internal combustion engine when said adsorption saturation determining means determines that the amount of nitrogen oxide adsorbed by the exhaust purifying catalytic device has reached the saturation range in the lean-combustion mode.

3. A control apparatus according to claim 2, wherein said adsorption saturation determining means determines that the amount of nitrogen oxide adsorbed by the exhaust purifying catalytic device has reached the saturation range when the nitrogen oxide discharge amount estimated by said nitrogen oxide discharge amount estimating means exceeds a predetermined value.

4. A control apparatus according to claim 3, wherein said first nitrogen oxide discharge amount estimating means includes second nitrogen oxide discharge amount estimating means for estimating a discharge amount of nitrogen oxide from the internal combustion engine to the exhaust passage, and adsorption ratio estimating means for estimating an adsorption ratio of nitrogen oxide adsorbed by the exhaust purifying catalytic device; and said first nitrogen oxide discharge amount estimating means estimates the discharge amount of nitrogen oxide from the exhaust purifying catalytic device based on the discharge amount of nitrogen oxide from the internal combustion engine estimated by said second nitrogen oxide discharge amount estimating means and the adsorption ratio of nitrogen oxide adsorbed by the exhaust purifying catalytic device estimated by said adsorption ratio estimating means.

5. A control apparatus according to claim 4, wherein said first nitrogen oxide discharge amount estimating means includes purification ratio estimating means for estimating a purification ratio of nitrogen oxide purified by the exhaust purifying catalytic device; and said first nitrogen oxide discharge amount estimating means estimates the discharge amount of nitrogen oxide from the exhaust purifying catalytic device based on the discharge amount of nitrogen oxide from the internal combustion engine estimated by said second nitrogen oxide discharge amount estimating means, the adsorption ratio of nitrogen oxide adsorbed by the exhaust purifying catalytic device estimated by said adsorption ratio estimating means, and the purification ratio of nitrogen oxide purified by the exhaust purifying catalytic device estimated by said purification ratio estimating means.

6. A control apparatus according to claim 4, wherein said second nitrogen oxide discharge amount estimating means estimates the discharge amount of nitrogen oxide from the internal combustion engine to the exhaust passage based on concentration of nitrogen oxide discharged from the internal combustion engine to the exhaust passage and an intake information variable representing an amount of intake air supplied to the internal combustion engine.

7. A control apparatus according to claim 6, wherein said second nitrogen oxide discharge amount estimating means estimates the concentration of nitrogen oxide discharged from the internal combustion engine to the exhaust passage based on an air-fuel ratio information variable representing the air-fuel ratio of the air-fuel mixture supplied to the internal combustion engine.

8. A control apparatus according to claim 4, wherein said second nitrogen oxide discharge amount estimating means corrects the discharge amount of nitrogen oxide from the internal combustion engine to the exhaust passage, estimated by said second nitrogen oxide discharge amount estimating means, according to ignition timing of the internal combustion engine.

9. A control apparatus according to claim 4, wherein said second nitrogen oxide discharge amount estimating means corrects the discharge amount of nitrogen oxide from the internal combustion engine to the exhaust passage, estimated by said second nitrogen oxide discharge amount estimating means, according to an amount of exhaust gases recirculated to the internal combustion engine.

10. A control apparatus according to claim 4, wherein said adsorption ratio estimating means estimates the adsorption ratio of nitrogen oxide adsorbed by the exhaust purifying catalytic device based on a total discharge amount of nitrogen oxide from the internal combustion engine to the exhaust purifying catalytic device during a time period beginning at start of the lean-combustion mode and ending at changeover to the rich-combustion mode.

11. A control apparatus according to claim 2, wherein said adsorption saturation determining means includes lean-combustion period measuring means for measuring a lean-combustion period during which the internal combustion engine operates in the lean-combustion mode; and said adsorption saturation determining means determines that the amount of nitrogen oxide adsorbed by the exhaust purifying catalytic device has reached the saturation range when the lean-combustion period measured by said lean-combustion period measuring means exceeds a predetermined value.

12. A control apparatus according to claim 2, wherein said adsorption saturation determining means includes lean-combustion accumulating means for accumulating load information on the internal combustion engine driven in the lean-combustion mode to thereby derive an accumulated value of the load information; and said adsorption saturation determining means determines that the amount of nitrogen oxide adsorbed by the exhaust purifying catalytic device has reached the saturation range when the accumulated value of the of load information derived by said lean-combustion driving accumulating means exceeds a predetermined value.

13. A control apparatus according to claim 12, wherein the load information includes an amount of fuel supplied to the internal combustion engine.

14. A control apparatus according to claim 1, wherein said combustion-state deteriorating means lowers a combustion temperature of the air-fuel mixture supplied to the internal combustion engine according to the adsorption state of nitrogen oxide estimated by said adsorption state estimating means.

15. A control apparatus according to claim 14, further comprising:

acceleration determining means for determining whether the internal combustion engine is in an acceleration driving mode by comparing load information, indicating a load state of the internal combustion engine, with an acceleration determining threshold value;

air-fuel ratio adjusting means for adjusting the air-fuel ratio to a value equal to or richer than the theoretical air-fuel ratio when said acceleration determining means determines that the internal combustion engine is in the acceleration driving mode; and threshold changing means for changing the acceleration determining threshold value in accordance with the adsorption state of nitrogen oxide estimated by said adsorption state estimating means.

16. A control apparatus according to claim 15, wherein said adsorption state estimating means includes adsorption saturation determining means for determining whether an amount of nitrogen oxide adsorbed by the exhaust purifying catalytic device has reached a saturation range; and said threshold changing means changes the acceleration determining threshold value to make it easier for said acceleration determining means to determine that the internal combustion engine is in the acceleration driving mode when said adsorption saturation determining means determines that the amount of nitrogen oxide adsorbed by the exhaust purifying catalytic device has reached the saturation range.

17. A control apparatus according to claim 15, wherein said acceleration determining means compares at least one operating state variable representing an operating state of the internal combustion engine with the acceleration determining threshold value to determine whether the internal combustion engine is in the acceleration driving mode.

18. A control apparatus according to claim 17, wherein said acceleration determining means makes the determination of whether the internal combustion engine is in the acceleration driving mode by comparing an operation speed of an output operating device, which adjusts an output of the internal combustion engine, with the acceleration determining threshold value.

19. A control apparatus according to claim 17, wherein said acceleration determining means makes the determination of whether the internal combustion engine is in the acceleration driving mode by comparing an operating state variable representing actuation of an acceleration pedal with the acceleration determining threshold value.

20. A control apparatus according to claim 15, wherein said acceleration determining means makes the determination of whether the internal combustion engine is in the acceleration driving mode by comparing an intake information variable, indicating an intake air state of the internal combustion engine, with the acceleration determining threshold value.

21. A control apparatus according to claim 20, wherein the intake information variable indicates a variation in an amount of intake air supplied to the internal combustion engine.

22. A control apparatus according to claim 20, wherein the intake information variable indicates a variation in pressure of intake air supplied to the internal combustion engine.

23. A control apparatus according to claim 14, wherein said combustion-state deteriorating means includes an ignition timing adjusting device for adjusting ignition timing of the internal combustion engine, and said combustion-state deteriorating means lowers the combustion temperature by instructing the ignition timing adjusting device to delay the ignition timing.

24. A control apparatus according to claim 14, wherein said combustion-state deteriorating means includes an exhaust gas re-circulation device for recirculating exhaust gases from the internal combustion engine to an intake system of the engine, and said combustion-state deteriorating means lowers the combustion temperature by instructing said exhaust gas re-circulation device to increase a recirculation amount of the exhaust gases.

25. A control apparatus according to claim 14, wherein said combustion-state deteriorating means includes an air-fuel ratio adjusting device for adjusting the air-fuel ratio of the air-fuel mixture supplied to the internal combustion engine, and said combustion-state deteriorating means lowers the combustion temperature by instructing the air-fuel ratio adjusting device to change the air-fuel ratio to a lean side.

26. A control apparatus according to claim 1, wherein said combustion-state deteriorating means maintains deterioration of the combustion state of the internal combustion engine for a predetermined period of time.

27. A control apparatus according to claim 26, wherein said combustion-state deteriorating means includes accumulating means for deriving an accumulated number of revolutions of the internal combustion engine on and after start of the deterioration of the combustion state in the internal combustion engine; and said combustion-state deteriorating means maintains the deterioration of the combustion state of the internal combustion engine until the accumulated number of revolutions derived by said accumulating means reaches a predetermined number of revolutions.

28. A control apparatus according to claim 1, wherein said combustion-state deteriorating means deteriorates the combustion state of the internal combustion engine by causing misfire in the internal combustion engine.

29. A control apparatus according to claim 28, wherein said combustion-state deteriorating means intermittently causes the misfire in the internal combustion engine by intermittently inhibiting ignition in the internal combustion engine.

30. A control apparatus according to claim 28, wherein said combustion-state deteriorating means intermittently causes the misfire in the internal combustion engine by adjusting the air-fuel ratio of the air-fuel mixture supplied to the internal combustion engine to a lean air-fuel ratio which is larger than an air-fuel ratio corresponding to a combustion limit of the internal combustion engine.

31. A control apparatus according to claim 28, wherein said combustion-state deteriorating means includes an exhaust gas recirculating device for recirculating exhaust gases from the internal combustion engine to an intake system thereof, and said combustion-state deteriorating means causes the misfire in the internal combustion engine by recirculating a predetermined amount of exhaust gases by means of said exhaust gas recirculating device.

32. A control apparatus according to claim 28, wherein said combustion-state deteriorating means causes the misfire in part of a plurality of cylinders of the internal combustion engine.

33. A control apparatus for an internal combustion engine having an exhaust purifying catalytic device disposed in an exhaust passage for reducing emission of nitrogen oxide discharged to atmosphere, the exhaust purifying catalytic device being operable to adsorb nitrogen oxide, contained in exhaust gases discharged from the internal combustion engine when the internal combustion engine is in a lean-combustion mode where an air-fuel ratio of an air-fuel mixture supplied to the engine is leaner than a theoretical air-fuel ratio, and to deoxidize adsorbed nitrogen oxide when the engine is in a rich-combustion mode where the air-fuel ratio is equal to or richer than the theoretical air-fuel ratio, comprising:

nitrogen oxide discharge amount estimating means for estimating a discharge amount of nitrogen oxide from the exhaust purifying catalytic device;

adsorption saturation determining means for determining whether the discharge amount of nitrogen oxide estimated by said nitrogen oxide discharge amount estimating means exceeds a predetermined amount; and combustion state changing means for changing the air-fuel ratio of the air-fuel mixture to change from the lean-combustion mode to the rich-combustion mode when said adsorption saturation determining means determines that the discharge amount of nitrogen oxide exceeds the predetermined amount in the lean-combustion mode.

34. A control apparatus according to claim 33, wherein said nitrogen oxide discharge amount estimating means includes engine nitrogen oxide discharge amount estimating means for estimating a discharge amount of nitrogen oxide from the internal combustion engine to the exhaust passage, and adsorption ratio estimating means for estimating an adsorption ratio of nitrogen oxide adsorbed by the exhaust purifying catalytic device; and said nitrogen oxide discharge amount estimating means estimates the discharge amount of nitrogen oxide from the exhaust purifying catalytic device based on the discharge amount of nitrogen oxide from the internal combustion engine estimated by said engine nitrogen oxide discharge amount estimating means and the adsorption ratio of nitrogen oxide adsorbed by the exhaust purifying catalytic device estimated by said adsorption ratio estimating means.

35. A control apparatus according to claim 34, wherein said nitrogen oxide discharge amount estimating means includes purification ratio estimating means for estimating a purification ratio of nitrogen oxide purified by the exhaust purifying catalytic device; and said nitrogen oxide discharge amount estimating means estimates the discharge amount of nitrogen oxide from the exhaust purifying catalytic device based on the discharge amount of nitrogen oxide from the internal combustion engine estimated by said engine nitrogen oxide discharge amount estimating means, the adsorption ratio of nitrogen oxide adsorbed by the exhaust purifying catalytic device estimated by said adsorption ratio estimating means, and the purification ratio of nitrogen oxide purified by the exhaust purifying catalytic device estimated by said purification ratio estimating means.

36. A control apparatus according to claim 34, wherein said engine nitrogen oxide discharge amount estimating means estimates the discharge amount of nitrogen oxide from the internal combustion engine to the exhaust passage based on concentration of nitrogen oxide from the internal combustion engine to the exhaust passage, and an intake information variable representing an amount of intake air supplied to the internal combustion engine.

37. A control apparatus according to claim 36, wherein engine nitrogen oxide discharge amount estimating means estimates the concentration of nitrogen oxide from the internal combustion engine to the exhaust passage based on an air-fuel ratio information variable representing the air-fuel ratio of the air-fuel mixture supplied to the internal combustion engine.

38. A control apparatus according to claim 34, wherein said engine nitrogen oxide discharge amount estimating means corrects the discharge amount of nitrogen oxide from the internal combustion engine to the exhaust passage estimated by said engine nitrogen oxide discharge amount estimating means according to ignition timing of the internal combustion engine.

39. A control apparatus according to claim 34, wherein said engine nitrogen oxide discharge amount estimating means corrects the discharge amount of nitrogen oxide from the internal combustion engine to the exhaust passage estimated by said engine nitrogen oxide discharge amount estimating means according to an amount of exhaust gases recirculated to the internal combustion engine.

40. A control apparatus according to claim 34, wherein said adsorption ratio estimating means estimates the adsorption ratio of nitrogen oxide adsorbed by the exhaust purifying catalytic device based on a total discharge amount of nitrogen oxide from the internal combustion engine to the exhaust purifying catalytic device during a time period beginning at start the lean-combustion mode and ending at changeover to the rich-combustion mode.

41. An internal combustion engine control method for reducing emission of nitrogen oxide to atmosphere, by causing nitrogen oxide, contained in exhaust gases discharged from an internal combustion engine, to be absorbed by an exhaust purifying catalytic device, disposed in an exhaust passage of the internal combustion engine, when the engine is in a lean-combustion mode where an air-fuel ratio of an air-fuel mixture supplied to the engine is leaner than a theoretical air-fuel ratio, and by deoxidizing adsorbed nitrogen oxide by means of the exhaust purifying catalytic device when the internal combustion engine is in a rich-combustion mode where the air-fuel ratio is equal to or richer than the theoretical air-fuel ratio, comprising:

a) estimating an adsorption state of nitrogen oxide adsorbed by the exhaust purifying catalytic device, said step a) including a step a0) of estimating a discharge amount of nitrogen oxide from the exhaust purifying catalytic device, and estimating said adsorption state of nitrogen oxide adsorbed by the exhaust purifying catalytic device based on said estimated discharge amount of nitrogen oxide from the exhaust purifying catalytic device; and deteriorating a combustion state of the internal combustion engine according to the adsorption state of nitrogen oxide estimated in said step a) when the engine is in the lean-combustion mode.

42. A control method according to claim 41, wherein said step a) includes a step of a1) determining whether an amount of nitrogen oxide adsorbed by the exhaust purifying catalytic device has reaches a saturation range; and said step b) includes deteriorating the combustion state of the internal combustion engine when it is determined in said step a) that the amount of nitrogen oxide adsorbed by the exhaust purifying catalytic device has reached the saturation range in the lean-combustion mode.

43. A control method according to claim 42, wherein said step a1) determines that the amount of nitrogen oxide adsorbed by the exhaust purifying catalytic device has reached the saturation range when the estimated discharge amount of nitrogen oxide from the exhaust purifying catalyst device exceeds a predetermined value.

44. A control method according to claim 43, wherein said step a0) includes the steps of a01) estimating the discharge amount of nitrogen oxide from the internal combustion engine to the exhaust passage, a02) estimating an adsorption ratio of nitrogen oxide adsorbed by the exhaust purifying catalytic device, and a03) estimating a discharge amount of nitrogen oxide from the exhaust purifying catalytic device based on the estimated amount of nitrogen oxide discharged from the internal combustion engine and the estimated adsorption ratio of nitrogen oxide adsorbed by the exhaust purifying catalytic device.

45. A control method according to claim 44, wherein said step a0) further includes a step of a04) estimating a purification ratio of nitrogen oxide purified by the exhaust purifying catalytic device, and said step a03) estimates the discharge amount of nitrogen oxide from the exhaust purifying catalytic device based on the estimated amount of nitrogen oxide discharged from the internal combustion engine, the estimated adsorption ratio of nitrogen oxide adsorbed by the exhaust purifying catalytic device, and the estimated purification ratio of nitrogen oxide purified by the exhaust purifying catalytic device.

46. A control method according to claim 44, wherein said step a01) includes estimating the discharge amount of nitrogen oxide from the internal combustion engine to the exhaust passage based on concentration of nitrogen oxide discharged from the internal combustion engine to the exhaust passage, and an intake information variable representing an amount of intake air supplied to the engine.

47. A control method according to claim 46, wherein said step a01) includes estimating the concentration of nitrogen oxide discharged from the internal combustion engine to the exhaust passage based on an air-fuel ratio information variable representing the air-fuel ratio of the air-fuel mixture supplied to the internal combustion engine.

48. A control method according to claim 44, wherein said step a0) further includes a step of a04) correcting the estimated discharge amount of nitrogen oxide from the internal combustion engine according to ignition timing of the internal combustion engine.

49. A control method according to claim 44, wherein said step a0) further includes a step of a04) correcting the estimated discharge amount of nitrogen oxide from the internal combustion engine according to an amount of exhaust gases recirculated to the internal combustion engine.

50. A control method according to claim 44, wherein said step a02) includes estimating the adsorption ratio of nitrogen oxide adsorbed by the exhaust purifying catalytic device based on a total discharge amount of nitrogen oxide from the internal combustion engine to the exhaust purifying catalytic device during a time period beginning at start of the lean-combustion mode and ending at changeover to the rich-combustion mode.

51. A control method according to claim 42, wherein said step a) includes a step of a0) measuring a lean-combustion period during which the internal combustion engine operates in the lean-combustion mode, and said step a1) determines that the amount of nitrogen oxide adsorbed by the exhaust purifying catalytic device has reached the saturation range when the measured lean-combustion period exceeds a predetermined value.

52. A control method according to claim 42, wherein said step a) includes a step of a0) accumulating load information on the internal combustion engine driven during the lean-combustion mode, and said step a1) determines that the amount of nitrogen oxide adsorbed by the exhaust purifying catalytic device has reached the saturation range when the load information thus accumulated exceeds a predetermined value.

53. A control method according to claim 52, wherein the load information includes an amount of fuel supplied to the internal combustion engine.

54. A control method according to claim 41, wherein said step b) includes lowering a combustion temperature of the air-fuel mixture supplied to the internal combustion engine according to the adsorption state of nitrogen oxide estimated in said step a).

55. A control method according to claim 54, further comprising:
- c) determining whether the internal combustion engine is in an acceleration driving mode by comparing load information, indicating a load state of the internal combustion engine, with an acceleration determining threshold value;
- d) adjusting the air-fuel ratio to a value equal to or richer than the theoretical air-fuel ratio when said step c) determines that the internal combustion engine is in the acceleration driving mode; and
- e) changing the acceleration determining threshold value according to the adsorption state of nitrogen oxide estimated in said step a).

56. A control method according to claim 55, wherein
said step a) includes determining whether the amount of nitrogen oxide adsorbed by the exhaust purifying catalytic device has reached the saturation range; and
said step e) includes changing the acceleration determining threshold value to make it easier to determine in said step c) that the internal combustion engine is in the acceleration driving mode when said step a) determines that the amount of nitrogen oxide adsorbed by the exhaust purifying catalytic device has reached the saturation range.

57. A control method according to claim 55, wherein said step c) includes determining whether the internal combustion engine is in the acceleration driving mode by comparing at least one an operating state variable representing an operating state of the internal combustion engine with the acceleration determining threshold value.

58. A control method according to claim 57, wherein said step c) includes comparing an operation speed of an output operating device, which adjusts an output of the internal combustion engine, with the acceleration determining threshold value.

59. A control method according to claim 57, wherein said step c) includes making the determination of whether the internal combustion engine is in the acceleration driving mode by comparing the operating state variable representing actuation of an acceleration pedal with the acceleration determining threshold value.

60. A control method according to claim 55, wherein said step c) includes making the determination of whether the internal combustion engine is in the acceleration driving mode by comparing the intake information variable indicating an intake air state of the internal combustion engine with the acceleration determining threshold value.

61. A control method according to claim 60, wherein the intake information variable indicates a variation in an amount of intake air supplied to the internal combustion engine.

62. A control method according to claim 60, wherein the intake information variable indicates a variation in pressure of intake air supplied to the internal combustion engine.

63. A control method according to claim 54, wherein said step b) includes lowering the combustion temperature by delaying the ignition timing of the internal combustion engine.

64. A control method according to claim 54, wherein said step b) includes a step of lowering the combustion temperature by increasing a recirculating amount of exhaust gases from the internal combustion engine to an intake system of the engine via an exhaust gas recirculating device.

65. A control method according to claim 54, wherein said step b) includes lowering the combustion temperature by changing the air-fuel ratio of the air-fuel mixture supplied to the internal combustion engine to a lean side.

66. A control method according to claim 41, wherein said step b) includes maintaining deterioration of the combustion state of the internal combustion engine for a predetermined period of time.

67. A control method according to claim 66, wherein said step b) includes steps of b1) deriving an accumulated number of revolutions of the internal combustion engine on and after start of deterioration of the combustion state in the engine, and b2) maintaining the deterioration of the combustion state of the internal combustion engine until the accumulated number of revolutions reaches a predetermined number of revolutions.

68. A control method according to claim 41, wherein said step b) includes deteriorating the combustion state of the internal combustion engine by causing misfire in the engine.

69. A control method according to claim 68, wherein said step b) includes intermittently causing the misfire in the internal combustion engine by intermittently inhibiting ignition in the internal combustion engine.

70. A control method according to claim 68, wherein said step b) includes intermittently causing the misfire in the internal combustion engine by adjusting the air-fuel ratio of the air-fuel mixture supplied to the internal combustion engine to a lean air-fuel ratio which is larger than an air-fuel ratio corresponding to a combustion limit of the internal combustion engine.

71. A control method according to claim 68, wherein said step b) includes causing the misfire in the internal combustion engine by recirculating a predetermined amount of exhaust gases to an intake system of the internal combustion engine via an exhaust gas recirculating device.

72. A control method according to claim 68, wherein said step b) includes causing the misfire in part of a plurality of cylinders of the internal combustion engine.

73. An internal combustion engine control method for reducing emission of nitrogen oxide to atmosphere, by causing nitrogen oxide, contained in exhaust gases discharged from the internal combustion engine, to be absorbed by an exhaust purifying catalytic device disposed in an exhaust passage of the internal combustion engine when the engine is in a lean-combustion mode where an air-fuel ratio of an air-fuel mixture supplied to the internal combustion engine is leaner than a theoretical air-fuel ratio, and by deoxidizing adsorbed nitrogen oxide by means of the exhaust purifying catalytic device when the engine is in a rich-combustion mode where the air-fuel ratio is equal to or richer than the theoretical air-fuel ratio, comprising:
- a) estimating a discharge amount of nitrogen oxide from the exhaust purifying catalytic device;
- b) determining whether the discharge amount of nitrogen oxide estimated in said step a) exceeds a predetermined amount; and
- c) changing the air-fuel ratio of the air-fuel mixture to change from the lean-combustion mode to the rich-combustion mode when it is determined in said step b) that the discharge amount of nitrogen oxide exceeds the predetermined amount in the lean-combustion mode.

74. A control method according to claim 73, wherein said step a) includes a1) estimating the discharge amount of nitrogen oxide from the internal combustion engine to the exhaust passage, a2) estimating an adsorption ratio of nitrogen oxide adsorbed by the exhaust purifying catalytic device, and a3) estimating the discharge amount of nitrogen oxide from the exhaust purifying catalytic device based on the estimated discharge amount of nitrogen oxide from the internal combustion engine and the estimated adsorption ratio of nitrogen oxide adsorbed by the exhaust purifying catalytic device.

75. A control method according to claim 74, wherein said step a) further includes a4) estimating a purification ratio of nitrogen oxide purified by the exhaust purifying catalytic device; and said step a3) estimates the discharge amount of nitrogen oxide from the exhaust purifying catalytic device based on the estimated discharge amount of nitrogen oxide from the internal combustion engine, the estimated adsorption ratio of nitrogen oxide adsorbed by the exhaust purifying catalytic device, and the estimated purification ratio of nitrogen oxide purified by the exhaust purifying catalytic device.

76. A control method according to claim 74, wherein said step a3) further includes estimating the discharge amount of nitrogen oxide from the internal combustion engine to the exhaust passage based on concentration of nitrogen oxide discharged from the internal combustion engine to the exhaust passage and an intake information variable representing an amount of intake air supplied to the engine.

77. A control method according to claim 76, wherein said step a3) includes estimating the concentration of nitrogen oxide discharged from the internal combustion engine to the exhaust passage based on an air-fuel ratio information variable representing the air-fuel ratio of the air-fuel mixture supplied to the internal combustion engine.

78. A control method according to claim 74, wherein said step a) further includes a step of a4) correcting the estimated discharge amount of nitrogen oxide from the internal combustion engine to the exhaust passage according to ignition timing of the engine.

79. A control method according to claim 74, wherein said step a) further includes a step of a4) correcting the estimated discharge amount of nitrogen oxide from the internal combustion engine to the exhaust passage according to an amount of exhaust gases recirculated to the internal combustion engine.

80. A control method according to claim 74, wherein said step a2) includes estimating the adsorption ratio of nitrogen oxide adsorbed by the exhaust purifying catalytic device based on a total discharge amount of nitrogen oxide from the internal combustion engine to the exhaust purifying catalytic device during a time period beginning at start of the lean-combustion mode and ending at changeover to the rich-combustion mode.

* * * * *